US012321991B1

(12) United States Patent
Marinos et al.

(10) Patent No.: US 12,321,991 B1
(45) Date of Patent: Jun. 3, 2025

(54) SYSTEM AND METHOD FOR INSURANCE CLAIM FORENSIC INVESTIGATIONS

(71) Applicants: Athanasios Tom Marinos, Coral Spring, FL (US); Eran Binyamin Shay, Pembroke Pines, FL (US)

(72) Inventors: Athanasios Tom Marinos, Coral Spring, FL (US); Eran Binyamin Shay, Pembroke Pines, FL (US)

( * ) Notice: Subject to any disclaimer, the term of this patent is extended or adjusted under 35 U.S.C. 154(b) by 0 days.

(21) Appl. No.: 17/899,815

(22) Filed: Aug. 31, 2022

Related U.S. Application Data

(60) Provisional application No. 63/245,957, filed on Sep. 20, 2021.

(51) Int. Cl.
*G06Q 40/08* (2012.01)
(52) U.S. Cl.
CPC .................................. *G06Q 40/08* (2013.01)
(58) Field of Classification Search
CPC ...................................................... G06Q 40/08
See application file for complete search history.

(56) References Cited

U.S. PATENT DOCUMENTS

| | | | | |
|---|---|---|---|---|
| 7,359,821 B1 * | 4/2008 | Smith | .................... | G01L 5/0052 702/113 |
| 7,941,386 B2 | 5/2011 | Bousquet et al. | | |
| 8,566,476 B2 | 10/2013 | Shiffer et al. | | |
| 8,856,152 B2 | 10/2014 | Kim et al. | | |
| 8,949,257 B2 | 2/2015 | Shiffer et al. | | |
| 9,183,560 B2 * | 11/2015 | Abelow | .............. | G06Q 30/0601 |
| 9,505,494 B1 * | 11/2016 | Marlow | ................ | G05D 1/0011 |
| 9,714,089 B1 * | 7/2017 | Louw | .................... | G05D 1/0094 |
| 10,102,586 B1 * | 10/2018 | Marlow | ................. | G06Q 40/08 |
| 10,146,810 B2 | 12/2018 | Shiffer et al. | | |
| 10,373,256 B1 * | 8/2019 | Allen | ...................... | G06Q 10/10 |

(Continued)

OTHER PUBLICATIONS

A Survey on the Internet of Things (IoT) Forensics: Challenges, Approaches, and Open Issues; IEEE Communications Surveys & Tutorials (vol. 22, Issue: 2, pp. 1191-1221) Authors: Maria Stoyanova 108 Yannis Nikoloudakis 108 Spyridon Panagiotakis 108 Evangelos Pallis 108 Evangelos K. Markaki (Year: 2020).*

(Continued)

*Primary Examiner* — Bruce I Ebersman
(74) *Attorney, Agent, or Firm* — John Rizvi; John Rizvi, P.A.—The Patent Professor ®

(57) ABSTRACT

A system and method for a forensic investigation service assignment application facilitating the collection of a variety of forensic data that is tagged to one or more base images. Further, data from other sources may be collected including, but not limited to, cause and origin data regarding causation of damage conditions, specifications of building materials, and other types of information associated with material specifications/properties to determine causation of damage assessment. In turn, the forensic investigation service assignment application facilitates the generation of damage assessment reports as a function of the forensic data collected and tagged to the base images. The forensic investigation service assignment application incorporates several process modules that include a mobile unit, an office base unit, an adjuster user client mobile unit, a market user client desktop unit, a drone field service module unit, and a data organizer.

13 Claims, 15 Drawing Sheets

(56) References Cited

U.S. PATENT DOCUMENTS

| | | | |
|---|---|---|---|
| 10,410,291 B1* | 9/2019 | Binion | G06Q 40/08 |
| 10,425,442 B2 | 9/2019 | Luger | |
| 10,453,147 B1* | 10/2019 | Davis | G06Q 40/08 |
| 10,476,759 B2 | 11/2019 | Rahaman | |
| 10,740,409 B2 | 8/2020 | Kordasiewicz et al. | |
| 11,308,741 B1* | 4/2022 | Cardona | G08G 1/0137 |
| 11,514,526 B1* | 11/2022 | Kwartler | G06V 10/82 |
| 11,755,878 B2* | 9/2023 | Cella | H04L 1/1874 |
| | | | 702/188 |
| 11,765,324 B1* | 9/2023 | Fu | H04N 23/661 |
| | | | 348/143 |
| 2009/0171961 A1 | 7/2009 | Fredrickson | |
| 2009/0265193 A1* | 10/2009 | Collins | G06Q 30/0185 |
| | | | 901/46 |
| 2011/0203383 A1* | 8/2011 | Phelps | G01M 5/0033 |
| | | | 73/786 |
| 2013/0226624 A1* | 8/2013 | Blessman | H04N 7/181 |
| | | | 705/4 |
| 2014/0245165 A1* | 8/2014 | Battcher | G06Q 40/08 |
| | | | 715/738 |
| 2015/0363717 A1* | 12/2015 | Lim | G06Q 10/10 |
| | | | 705/4 |
| 2017/0277662 A1 | 9/2017 | Saliba et al. | |
| 2019/0236661 A1* | 8/2019 | Hogg | G06Q 30/0641 |
| 2020/0065632 A1* | 2/2020 | Guo | H04N 23/80 |
| 2020/0184706 A1* | 6/2020 | Speasl | H04L 9/0643 |
| 2022/0005121 A1* | 1/2022 | Hayward | G06N 3/044 |
| 2024/0020968 A1* | 1/2024 | Haskin | G06F 16/29 |

OTHER PUBLICATIONS

Overview of the Forensic Investigation of Cloud Services ; Published in: 2015 10th International Conference on Availability, Reliability and Security (pp. 556-565) Authors: Jason Farina 108 Mark Scanlon 108 Nhien-An Le-Khac 108 M-Tahar Kechadi (Year: 2015).*

AVGuard: A Forensic Investigation Framework for Autonomous Vehicles, IEEE 2021 (Year: 2021).*

Computational Forensics: Towards Hybrid-Intelligent Crime Investigation, IEEE 2008 (Year: 2008).*

Investigation of Countermeasures to Anti-Forensic Methods, IEEE 2019 (Year: 2019).*

Log Your Car: The Non-invasive Vehicle Forensics, IEEE 2016 (Year: 2016).*

* cited by examiner

SYSTEM AND METHOD FOR INSURANCE CLAIM FORENSIC INVESTIGATIONS

CROSS-REFERENCE TO RELATED APPLICATION

This application claims the benefit of U.S. Provisional Application 63/245,957, filed Sep. 20, 2021, which is hereby incorporated by reference herein in its entirety.

FIELD OF THE INVENTION

The present invention relates generally to insurance claims systems, and more particularly, to a system and method that facilitates a platform the conducting and processing of forensic investigations for insurance claims.

BACKGROUND OF THE INVENTION

Individuals, corporations, and governmental bodies obtain and need insurance to protect against risks, losses and deleterious events that may cause financial ruin. Various types of insurance policies exist from automobile, homeowners, renters, life, business owner, general liability, workers compensation, crime, cyber threats, construction defects, builder's risk, professional liability, and property, to name just a few. Of course, from time-to-time events occur that require the policyholder to file a claim under their respective insurance policy with the insurance provider. An insurance claim is a formal written request (e.g., a notice to file claim) by a policyholder to an insurance provider for coverage and/or compensation for a covered loss or policy event. The insurance provider validates the claim or denies the claim, after review. If it is approved, the insurance provider will issue payment to the insured or an approved interested party on behalf of the insured. Insurance claims cover everything from property damage, death benefits on life insurance policies to routine and comprehensive medical exams. In some cases, a third-party is able to file claim(s) on behalf of the insured person. However, in the majority of cases, only the person(s) listed on the policy is/are entitled to claim payments.

Of course, as will be appreciated insurance policies comprise complex legal agreements that specify items to be afforded coverage with respect to particular perils. Numerous conditions typically apply including deductibles, coverage limits, and so forth. Modern insurance policies also often include expense/billing information that breaks down the total cost of the agreement into elements by covered item and peril. Insurance carriers often view such policies as being derived from and related to a "policy product." A policy product defines the attributes and shared data for its derived policies. The process of writing a specific policy involves referring to the available attributes of the policy as defined by the policy product and the corresponding selection of appropriate values for a given customer. For example, when writing a commercial package policy, the insurer will typically refer to a commercial package policy product to ascertain that such a policy contains coverage with respect to general liability, commercial property, and other more specialized kinds of coverage. The insurer then uses this information to facilitate capture of additional information to fully define the policy and price the insurance coverage offered thereunder. Insurance policies are typically defined at various levels of granularity with a collection of coverages typically comprising a most basic level of resolution through higher resolution levels. The insurance coverage comprises an obligation to pay for damages that are caused by a particular peril (or collection of perils). The obligation typically has corresponding financial limits and deductibles that circumscribe the insurer's responsibility for losses against that coverage. A policy's total cost is usually determined as a function of the aggregate cost of the policy's constituent coverages.

As such, the filing and investigation of an insurance claim can be a complicated and somewhat intensive process. There is typically no one-size-fits-all outcome, and how your insurance claim is handled largely depends on the written provisions in the applicable insurance policy. In most cases, the filing of claim involves communicating with your insurance provider, organizing, and completing the required paperwork, completion of one or more investigations, a damage appraisal made by an adjuster, paying any applicable deductible, and a final disposition of the claim (i.e., settlement or denial). This can be a very time consuming process and extended over a long time period with many different involved parties. When a claim is settled the insured party typically receives, among other things, a monetary award.

Insurance companies routinely handle and process forensic investigations for filed insurance claims such as property losses, construction defects, builder risk and professional liability claims. Currently, within the forensic investigation insurance industry there is no system or method for a forensic investigation firm to utilize that captures and consolidates field data in a centralized location and combines such data with other relevant site data such as aerial imagery, material cause and origin assessment data, and/or material specifications with weather information/analysis (if the investigation/claim involves a weather-related event) allowing the expert user (e.g., a professional engineer or registered architect) to prepare and generate cause and origin damage assessment reports for the insurance claim. Of course, the generation and compilation of these documents is a very labor intensive and individualized endeavor. Such reports are required by the independent adjusters and insurance carrier(s) to be able to determine and decide on policy coverage for the particular loss under investigation. In addition, construction litigation attorneys require such information to defend their client in litigated insurance claim cases.

The gathering of such data in the field tends to be very tedious work and every field investigator typically performs their own data gathering and annotations thereof in various formats. Each new forensic investigation team member must go through a learning curve to absorb the details of each team's working model and what the requirements are for data gathering and compilation. One negative aspect of this procedure is the potential for lost data during and after the completion of an investigation. Further, this becomes a time-consuming task to accurately organize the field data, sorting the data, determining the relevance thereof, and whether the data is appropriate for incorporation into an expert report, for example. The field data sorting and analysis is also typically distributed in nature and not consolidated into a single field location.

Accordingly, there is need for an improved technique that facilitates the conducting and processing of forensic investigations of various forms of insurance claims.

SUMMARY OF THE INVENTION

The present invention is directed to a system and method for facilitating a platform for the conducting and processing of forensic investigations of various forms of insurance claims including, but not limited to, property damage losses, construction defects, builders' risk, and professional liability.

In a first implementation of the invention, a method is provided for processing and handling forensic investigations of various forms of insurance claims. The method comprising: providing a forensic investigation service assignment application for collecting a variety of forensic data (e.g., damage assessment of property) and tagging the forensic data to one or more base images including, but not limited to, aerials, construction documents and site plans/maps. The method comprising: (i) receiving a plurality of forensic data items, the plurality of forensic data items specific to an insurance claim; (ii) tagging each forensic data item of the plurality of forensic data to one or more base images; (iii) collecting data from other information sources for analyzing the insurance claim; (iv) storing and consolidating, in one or more databases, the plurality of forensic data received, the one or more base images tagged to the each forensic data item of the plurality of the forensic data items, and the data from other information sources collected; and (v) generating, using the one or more databases, at least one damage assessment report using at least one of the each forensic data items of the plurality of forensic data tagged to the one or more base images and a selection of the data from other information sources collected. In this way, the forensic investigation services methodology provides for the collection of a variety of forensic data (e.g., damage assessment of property) that is tagged to one or more base images including, but not limited to, aerials, construction documents and site plans/maps. Further, data from other sources may be collected including, but not limited to, cause and origin data regarding causation of damage conditions, specifications of building materials, and other types of information associated with material specifications/properties that would be beneficial for the forensic investigator/other expert to determine causation of damage assessment. In turn, the forensic investigation operations facilitate the generation of damage assessment reports as a function of the forensic data collected and tagged to the base images. Advantageously, insurance companies and insurance claims professionals may then access the damage assessment reports in the context of analyzing and adjusting a particular loss associated with an insurance claim.

In a second aspect, a system is provided for processing and handling forensic investigations of various forms of insurance claims. The system comprising: a processor, a display, at least one database, and a memory storing instructions that when executed cause the processor to perform operations of (i) receiving a plurality of forensic data items, the plurality of forensic data items specific to an insurance claim; (ii) tagging each forensic data item of the plurality of forensic data to one or more base images; (iii) collecting data from other information sources for analyzing the insurance claim; (iv) storing and consolidating, in one or more databases, the plurality of forensic data received, the one or more base images tagged to the each forensic data item of the plurality of the forensic data items, and the data from other information sources collected; and (v) generating, using the one or more databases, at least one damage assessment report using at least one of the each forensic data items of the plurality of forensic data tagged to the one or more base images and a selection of the data from other information sources collected.

In a third aspect, an application (alternatively referred to herein as an "app") may be executed on the system and/or a user device for processing and handling forensic investigations of various forms of insurance claims. The app comprising operations for: (i) receiving a plurality of forensic data items, the plurality of forensic data items specific to an insurance claim; (ii) tagging each forensic data item of the plurality of forensic data to one or more base images; (iii) collecting data from other information sources for analyzing the insurance claim; (iv) storing and consolidating, in one or more databases, the plurality of forensic data received, the one or more base images tagged to the each forensic data item of the plurality of the forensic data items, and the data from other information sources collected; and (v) generating, using the one or more databases, at least one damage assessment report using at least one of the each forensic data items of the plurality of forensic data tagged to the one or more base images and a selection of the data from other information sources collected.

In a fourth aspect, the insurance claim is directed to at least one of a property loss claim, a construction defect claim, a builders' risk claim and a professional liability claim.

In a fifth aspect, the plurality of forensic data items are associated with property damage assessment.

In a sixth aspect, the one or more base images comprising at least one of aerials, construction documents and site plans, and maps.

In a seventh aspect, the data from other information sources collected comprising at least one of cause and origin data regarding causation of damage conditions, specifications of building materials, and information associated with material specifications/properties for determining causation of damage assessment.

In an eight aspect, the damage report(s) are transmitted to one or more third-party experts.

In a ninth aspect, a plurality of damage assessment reports are provided for use in generating the damage assessment report specific to an insurance claim.

In a tenth aspect, an observation list is generated from the tagged images.

In another aspect, still and/or video images are received from an unmanned aerial vehicle (UVA) for use in generating the damage assessment report. In another aspect, the UAV is a drone.

In another aspect, the plurality of forensic data items are tagged using at least a pair of longitude and latitude coordinates, at least one photograph, and at least one remark.

In another aspect, a post-processing of the plurality of forensic data items received is performed as a function of a type of the insurance claim.

In another aspect, the damage report generated is displayed and transmitted to a third-party expert.

In another aspect, at least one of the databases is a relational database.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
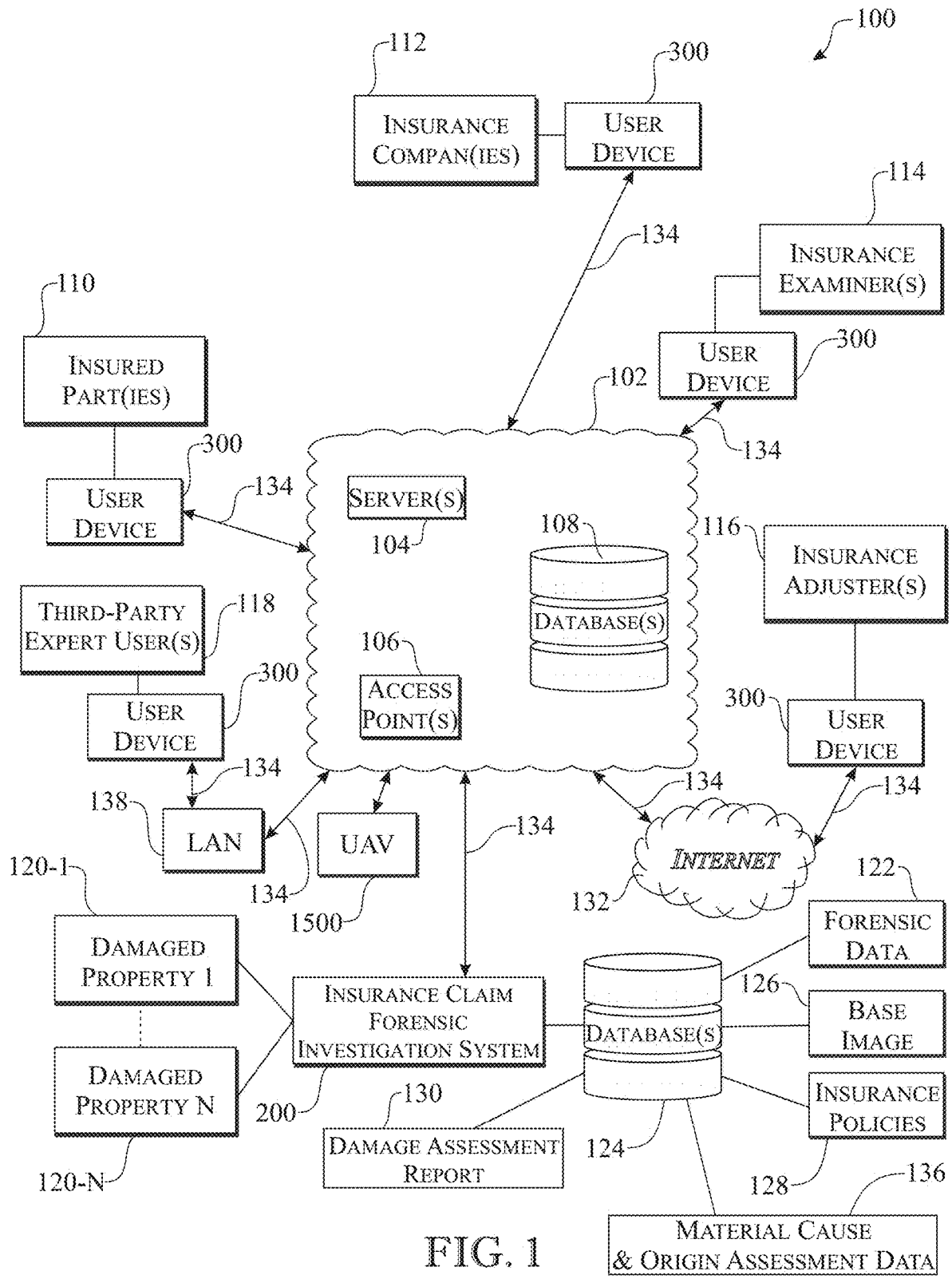
FIG. 1 presents a high-level block diagram of a cloud network services architecture for providing a forensic investigation services system in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed to a system and method for facilitating a platform for the conducting and processing of forensic investigations of various forms of insurance claims. In accordance with the principles of the embodiments, a forensic investigation service assignment application facilitates the collection of a variety of forensic data (e.g., damage assessment of property) that is tagged to one or more base images including, but not limited to, aerials, construction documents and site plans/maps. Further, data from other sources may be collected including, but not limited to, cause and origin data regarding causation of damage conditions, specifications of building materials, and other types of information associated with material specifications/properties that would be beneficial for the forensic investigator/other experts to determine causation of damage assessment. In turn, the forensic investigation service assignment application facilitates the generation of damage assessment reports as a function of the forensic data collected and tagged to the base images. Importantly, the forensic investigation service assignment application system and method of the disclosed embodiments provides an advantageous improvement of practical application that include the forensic investigation of insurance claims and the processing and settlement thereof, insurance claims processing and platforms, and data analysis/synthesis. Therefore, the disclosed embodiments address the problem in forensic investigation insurance industry which lacks a system or method for forensic investigation professionals to utilize that captures and consolidates field data in a centralized location and combines such data with other relevant site data such as aerial imagery, material cause and origin assessment data, and/or material specifications with weather information/analysis (if the investigation/claim involves a weather-related event) allowing the third-party expert user (e.g., a professional engineer or registered architect) to prepare and generate cause and origin damage assessment reports for the insurance claim. Advantageously, insurance companies and insurance claims professionals may then access the damage assessment reports in the context of analyzing and adjusting a particular loss associated with an insurance claim. As such, in accordance with the principles of the disclosed embodiments, an integration platform is provided for third-party components using an Application Programming Interface (API), for example, that allows functional and component modularity.

As shown for instance in FIG. 1, the cloud network services architecture 100 includes a cloud 102 comprising at least server(s) 104, access point(s) 106 and database(s) 108. As will be detailed herein below, the cloud 102 facilitates the delivery of the insurance claim forensic investigation processing using insurance claim forensic investigation system 200 to a plurality of parties (e.g., the plurality parties comprised by insured party(ies) 110, insurance company(ies) 112, insurance examiner(s) 114, insurance adjuster(s) 116, and third-party expert user(s) 118), whereby the individual parties may play, individually and collectively, some role in the overall insurance claim forensic investigation process. In an embodiment, the insurance claim forensic investigation processing, offered by and through the cloud network services architecture 100 and insurance claim forensic investigation system 200 will be facilitated by an insurance claim forensic investigation app 400 (see, FIG. 4), as will be detailed herein below, executing on a user device 300 (see, FIG. 3). The user device 300 provides the various parties (e.g., insured party(ies) 110, insurance company(ies) 112, insurance examiner(s) 114, insurance adjuster(s) 116, and third-party expert user(s) 118) with real-time access to an insurance claim forensic investigation platform and processing methodology in accordance with the disclosed embodiments herein.

As will be appreciated, insurance claim adjusters plan and schedule the work required to process an insurance claim. They might, for example, handle the claim filed after a storm damages an insured party's home or business operations (see, e.g., damaged property 1 120 through damaged property N 120-N). For example, adjusters investigate claims by interviewing the claimant and witnesses, consulting police and hospital records, and inspecting property damage to determine how much the insurance company should pay (if anything) for the loss under the governing insurance policy. Adjusters may consult with other professionals/third-party experts, such as accountants, architects, construction workers, engineers, lawyers, and physicians, who can offer a more expert evaluation of a claim. The information gathered (e.g., photographs and statements, either written, or recorded audio or video) is codified in a report that is then used to evaluate the claim. When (and if) the policyholder's claim is approved, the claims adjuster may negotiate in some instances with the claimant and settle the claim. When claims are contested, adjusters will work with attorneys and third-party expert witnesses to defend the insurer's position. Claims examiners within property and casualty insurance firms may have duties similar to those of an adjuster, but often their primary responsibility is to review claims after they are submitted in order to ensure that proper guidelines have been followed. They may assist adjusters with complicated claims or when, for instance, a natural disaster suddenly greatly increases the volume of claims. For example, in health insurance companies, claims examiners review health-related claims to see whether costs are reasonable given the diagnosis, and use guides that have information on the average period of disability, expected treatments, and average hospital stays for various ailments. Examiners check claim applications for completeness and accuracy, interview medical specialists, and consult policy files to verify the information reported in a claim. In life insurance applications, for example, claims examiners review the causes of death, particularly in the case of an accident, since most life insurance policies pay additional benefits if a death is accidental. Claims examiners also may review new applications for life insurance to make sure that the applicants have no serious illnesses that would make them an elevated risk to insure. They then authorize appropriate payment, deny the claim, or refer the claim to an investigator for a more thorough review. Insurance claims examiners may also specialize in group or individual insurance plans and in hospital, dental, or prescription drug claims. For clarity, it will be understood that while FIG. 1 shows both the insurance examiner(s) 114 and the insurance adjuster(s) 116 as separate individuals (with an associated user device 300) in various embodiments consistent with the disclosed principles hereunder the functions of the insurance examiner and the insurance adjuster may be performed in a consolidated manner by a single individual (e.g., the insurance examiner(s) 114 or the insurance adjuster(s) 116, or vice versa).

As noted above, the cloud 102 comprises at least server(s) 104, the access point(s) 106 and the database(s) 108. Cloud, cloud service, cloud server and cloud database are broad terms and are to be given their ordinary and customary meaning to one of ordinary skill in the art and includes, without limitation, any database, data repository or storage media which store content typically associated with and managed by users, insurance claims forensic processing services, insurance regulatory bodies, insured parties, insurance providers, third-party insurance experts, and third-party content providers, to name just a few. A cloud service may include one or more cloud servers and cloud databases that provides for the remote storage of content as hosted by a third-party service provider or operator. A cloud server may include an HTTP/HTTPS server sending and receiving messages in order to provide web-browsing interfaces to client web browsers as well as web services to send data to integrate with other interfaces (e.g., as executed on the user device 300). The cloud server may be implemented in one or more servers and may send and receive content in a various forms and formats, user supplied and/or created information/content and profile/configuration data that may be read from or stored in a cloud database (e.g., the databases 108).

A cloud database may include one or more physical servers, databases or storage devices as dictated by the cloud service's storage requirements. The cloud database may further include one or more well-known databases (e.g., an SQL database) or a fixed content storage system to store content, insurance policies, profile information, configuration information or administration information as necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service) and management tools.

Figure 2:
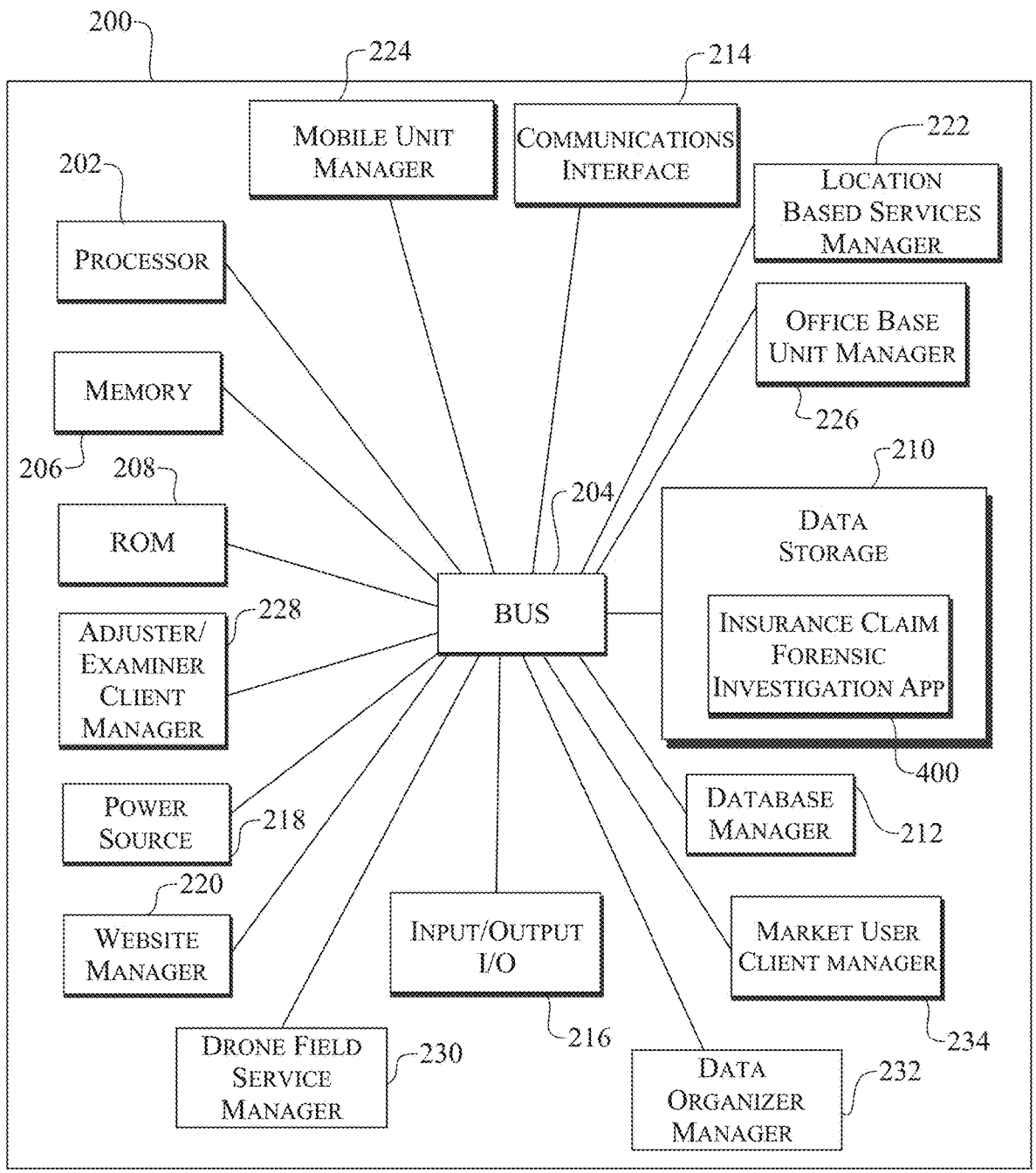
FIG. 2 presents an illustrative forensic investigation services system in accordance with an embodiment.

Turning our attention to FIG. 2, an illustrative configuration for the insurance claim forensic investigation system 200 is shown for deployment in the cloud network services architecture 100 in accordance with an embodiment. As shown, the insurance claim forensic investigation system 200 comprises processor 202 for executing program code (e.g., insurance claim forensic investigation app 400) and communications interface 214 for managing communications to and from the insurance claim forensic investigation system 200, memory 206 and/or read-only memory (ROM) 208 for storing program code and data, and power source 218 for powering the insurance claim forensic investigation system 200. The memory 206 is coupled to the bus 204 for storing computer-readable instructions to be executed by the processor 202 (e.g., execution of the insurance claim forensic investigation app 400). Database manager 212 is used to manage the delivery and storage of content, data, and other information in the database(s) 124, database(s) 108 and across third-party content providers, for example. The database(s) 124 may store and provide information including, but not limited, to forensic data 122, base images 126, insurance policies 128, damage assessment reports 130, and material cause & effect origin assessment data 136.

Website manager 220 is used to deliver and manage content, data, and other information across one or more websites that may be utilized to access and use the insurance claim forensic investigation system 200, for example. Further, the operations provided by and through the insurance claim forensic investigation app 400 may be offered through a web-based application. As will be discussed in greater detail herein below, the insurance claim forensic investigation app 400, as stored in data storage 210, when executed by the processor 202 will enable access by a plurality of parties (e.g., insured party(ies) 110, insurance company(ies) 112, insurance examiner(s) 114, insurance adjuster(s) 116, and third-party expert user(s) 118) to the insurance claim forensic investigation system 200 for the processing of a notice of insurance claim filed by the insured party(ies) 110, for example, under a particular insurance policy that such parties are responsible for resolving. Location-based services manager 222 facilitates the delivery of location-based services (e.g., Global Positioning System (GPS) tracking) either independently or on user device 300 thereby allowing the insurance claim forensic investigation system 200 to register the exact location of the user of the user device 300, for example, as the user roams from one location to another location such that the services offered via the insurance claim forensic investigation processing hereunder may be tailored to a current location and/or the needs of the user/party may change based on their current location.

In an embodiment, the insurance claim forensic investigation processing provided through the execution of the insurance claim forensic investigation app 400 may also include a web-based delivery platform and/or accessing and interfacing any number of web using website manager 220 for procuring information and data that can be used in the insurance claim forensic investigation system 200. The term "website" in the context herein is used in a conventional and broadest sense and is located on at least one server containing web pages stored thereon and is operational in a 24-hour/7-day typical fashion. Further, as shown in the cloud network services architecture 100, the plurality of parties (i.e., insured party(ies) 110, insurance company(ies) 112, insurance examiner(s) 114, insurance adjuster(s) 116, and third-party expert user(s) 118) may alternatively utilize well-known Internet 132 for access to insurance claim forensic investigation system 200 by and through a web browser on the user device 300, for example.

The communications interface 214 is used to facilitate communications across the communications links 134 (see, FIG. 1) within the cloud network services architecture 100. This may take the form, for example, of a wide area network connection that communicatively couples the insurance claim forensic investigation system 200 with the access points 106 (see, FIG. 1) which may be a cellular communications service. Similarly, communications managed by the communications interface 214 may take the form, for example, of a local Wi-Fi network interface or Ethernet interface the communicatively couples the insurance claim forensic investigation system 200 with the Internet 132, LAN 138 and ultimately the user device 300. In the instant embodiment, the insurance claim forensic investigation app 400 and/or the communications interface 214 may include a communications stack for facilitating communications over the respective communications link 134. Electronic communications by and through insurance claim forensic investigation system 200 between the various systems, networks, devices, users, entities, and/or individuals are facilitated by the communications links 134 in accordance with any number of well-known communications protocols and methods (e.g., wireless communications).

Mobile unit manager 224 facilitates the receiving and processing of imaging files, construction plan files, support files, and user input files, and office base unit manager 226 facilitates the receiving and generating of one or more reports, by a report development and analysis module (not shown) incorporated therein, using post process field data, post process data analysis, checklist reviews, user defined report templates, and data analysis/research and assignment information. The adjuster/examiner client manager 228 facilitates the receiving and processing of new assignment requests, client information, and analysis requests, and providing limited forensic data access, and a market user client manager 234 provides for the receiving and processing accessible market user client information. A drone field service manager 230 enables the receiving and processing of information collected using a UAV (e.g., a drone) including, but not limited to, drone field data, images and/or video, and post-process field image data, and a data organizer manager 232 provides for accessing and receiving technical document databases, historical document databases and/or public information databases. In this way, the insurance claim forensic investigation modules and associated methodology herein provides for the real-time handling and processing of forensic investigations involving property losses, construction defects, builders risk and/or professional liability by capturing and consolidating forensic field data in a centralized fashion and combining such forensic field data with other relevant site data such as aerial imagery, material cause and effect assessment data, and/or material specifications with weather-related information and analysis (e.g., to the extent the insurance claim involves one or more weather-related events). In accordance with the principles of the disclosed embodiments, this centralized and consolidated approach facilitates the continual access to the various forensic data and other data elements (e.g., by an insurance adjuster out in the field conducting the forensic investigation), and the preparation and generation of damage assessment reports (e.g., a cause and origin damage assessment report) specific to the forensic claim under investigation. These reports are required (e.g., for use by insurance adjusters and/or insurance carriers) in order to fully investigate the claim and to render a coverage decision based on the insurance policy (or policies) governing the filed claim and coverage of loss.

Figure 3:
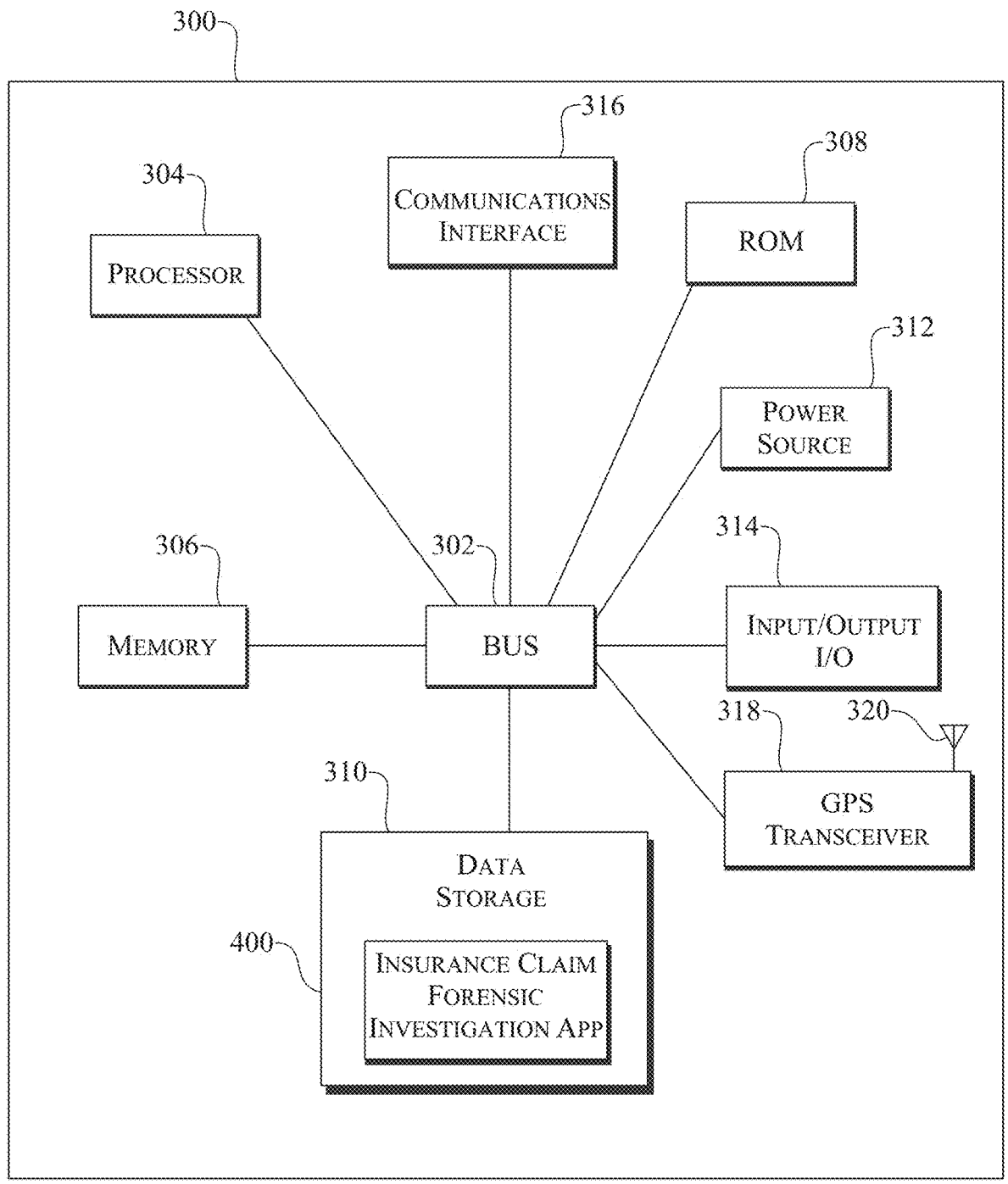
FIG. 3 presents an illustrative user device configured for use with the forensic investigation services system of FIG. 2 in accordance with an embodiment.

Turning our attention briefly to FIG. 3, an illustrative user device 300 is shown for deployment with the cloud network services architecture 100 of FIG. 1 in accordance with an embodiment. The user device 300 includes bus 302 and processor 304 coupled to the bus 302 for executing operations and processing information. As will be appreciated, a "user device" in the context herein may comprise a wide variety of devices such as any type of mobile device, smartphones, laptop computers, desktop computers, tablets, and wearable device, to name just a few, that execute applications (e.g., a mobile application) in accordance with the principles of the disclosed embodiments herein. For example, the execution of the operations of insurance claim forensic investigation app 400 as will be discussed in much greater detail herein below. The processor 304, as powered by power source 312, may include both general and special purpose microprocessors, and may be the sole processor or one of multiple processors of the device. This is equally applicable to the processor 202 of FIG. 2. Further, the processor 304 (or the processor 202) may comprise one or more central processing units (CPUs) and may include, be supplemented by, or incorporated in, one or more application-specific integrated circuits (ASICs) and/or one or more field programmable gate arrays (FPGAs).

The user device 300 may also include memory 306 coupled to the bus 302 for storing computer-readable instructions to be executed by the processor 304. The memory 306 may also be utilized for storing temporary variables or other intermediate information during the execution of the instructions by the processor 304. The user device 300 may also include ROM 308 or other static storage device coupled to the bus 302. Further, data storage device 310, such as a magnetic, optical, or solid-state device may be coupled to the bus 302 for storing information and instructions for the processor 304 including, but not limited to, the insurance claim forensic investigation app 400. Data storage device 310 (or the data storage device 210) and the memory 306 (and the memory 206) may each comprise a non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 300 may also include one or more communications interface 316 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 316 (or the communications interface 214) may be an integrated services digital network (ISDN) card or modem/router used to facilitate data communications of various well-known types and formats. Further, illustratively, the communications interface 316 (or the communications interface 214) may be a LAN card used to provide data communication connectivity to a comparable LAN. Wireless communication links may also be implemented. The GPS transceiver 318 and antenna 320 facilitate delivery of location-based services in order to register the exact location of the user device 300, for example, as the user roams from one location to another location in the course of the forensic investigation.

As will be appreciated, the functionality of the communication interface 316 (or the communications interface 214) is to send and receive a variety of signals (e.g., electrical, optical, or other signals) that transmit data streams representing various data types. The user device 300 may also include one or more input/output devices 314 that enable user interaction with the user device 300 (e.g., camera, display, keyboard, mouse, speakers, microphone, buttons, etc.). The input/output devices 314 (or the I/O devices 216) may include peripherals, such as a camera, printer, scanner, display screen, etc. For example, the input/output devices 314 (or VO devices 216) may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 300 or an associated display device, for example. As detailed herein, while FIG. 3 describes an embodiment of the insurance claim forensic investigation app 400 for execution, illustratively, on the user device 300 it will also be understood that other hardware devices may be used to execute and operate the insurance claim forensic investigation app 400 in any real-time setting including, but not limited to, the cloud network services architecture 100. For example, a network-enabled portable tablet computer and/or dedicated portable hardware device may be employed equally in the context of the disclosed embodiments.

Figure 4:
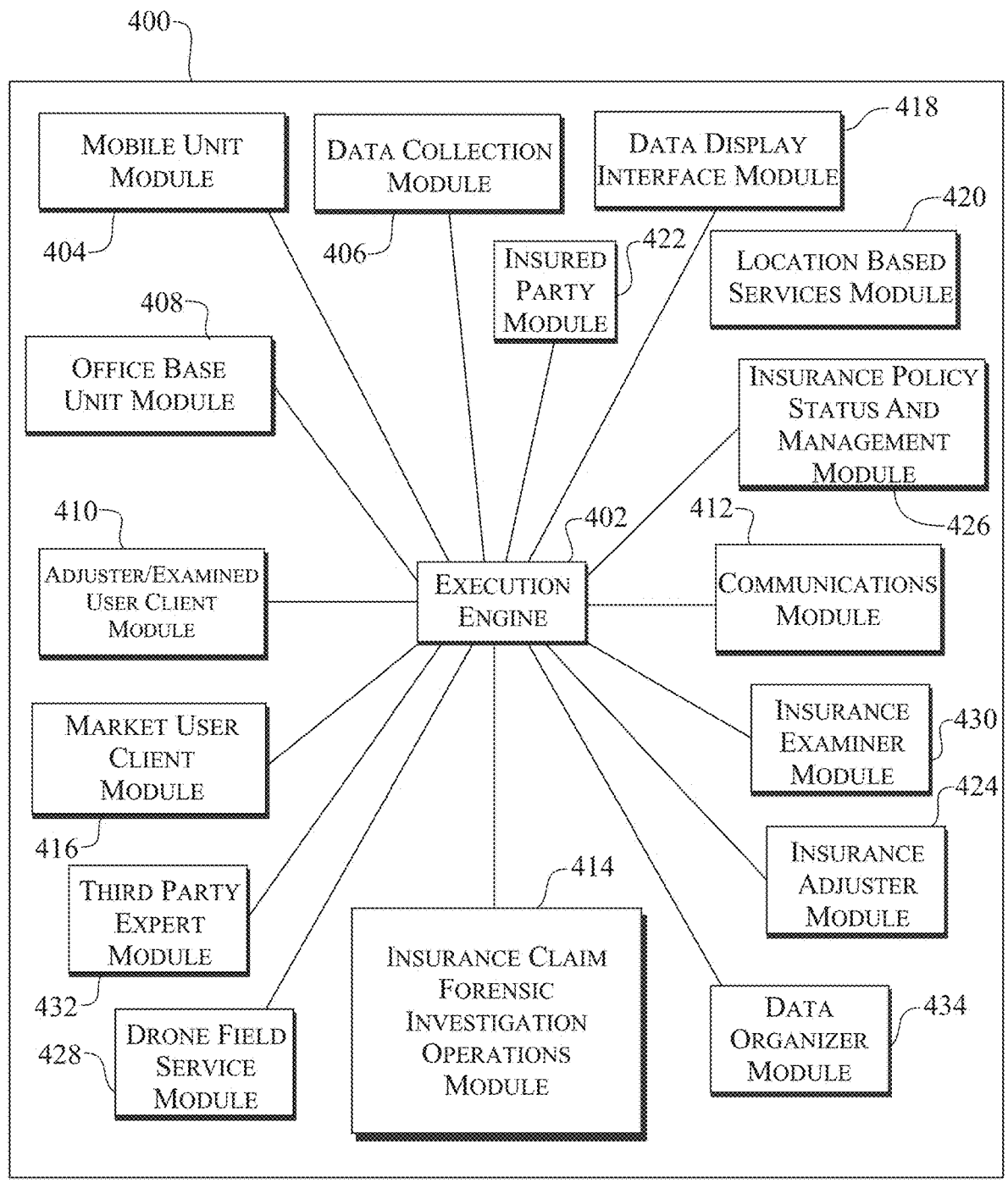
FIG. 4 presents an illustrative architecture for an insurance claim forensic investigation app in accordance with an embodiment.

Turning our attention to FIG. 4, an illustrative architecture for the operation of the insurance claim forensic investigation app 400 is presented in accordance with an embodiment. As will be appreciated, the architecture may be used in conjunction with the cloud network services architecture 100, the insurance claim forensic investigation system 200, and/or the user device 300 for launching and executing the insurance claim forensic investigation app 400 and its associated operations. As shown, the architecture for the operations of the insurance claim forensic investigation app 400 provides several interfaces and engines used to perform a variety of functions such as the collection, aggregation, manipulation, processing, analyzing, verification, authentication, and display of applicable real-time information and data that are useful to achieve the insurance claim forensic investigation processing of the disclosed embodiments. More particularly, data display interface module 418 and communications module 412 are used to facilitate the input/output and display of electronic data and other information to, illustratively, the users (e.g., insured party(ies) 110, insurance company(ies) 112, insurance examiner(s) 114, insurance adjuster(s) 116, and third-party expert user(s) 118) employing the user device 300 (e.g., a touch screen of the user device 300) and executing the insurance claim forensic investigation app 400. The data collection module 406 facilitates the collection of relevant insurance claim, insurance policy and/or other applicable information from the plurality of parties (i.e., insured party(ies) 110, insurance company(ies) 112, insurance examiner(s) 114, insurance adjuster(s) 116, and third-party expert user(s) 118) and/or other third parties. The location-based services module 420 provides for the delivery of location-based services in order for the geographic locations of the parties to be identified and displayed (e.g., GPS locations). The communications module 412 will facilitate communications by and through the insurance claim forensic investigation system 200, for example.

Execution engine 402 may be employed to deliver the insurance claim forensic investigation processing herein through the execution of the insurance claim forensic investigation app 400. In such delivery, the execution engine 402 will operate and execute, as further detailed herein below, with at least the following program modules: mobile unit module 404, data collection module 406, data display interface module 418, location-based services module 420, office base unit module 408, adjuster/examiner user client module 410, communications module 412, insurance claim forensic investigation operations module 414, market user client module 416, insured party module 422, insurance adjuster module 424, insurance policy status & management module 426, drone field service module 428, insurance examiner module 430, third-party expert module 432, and data organizer module 434. The operations executed by the foregoing modules, which work in tandem with the insurance claim forensic investigation system 200, for example, will now be further discussed in greater detail.

Mobile unit module 404 facilitates the receiving and processing of imaging files, construction plan files, support files, and user input files, and the office base unit module 408 facilitates the receiving and generating of one or more reports, by a report development and analysis module (not shown) incorporated therein, using post process field data, post process data analysis, checklist reviews, user defined report templates, and data analysis/research and assignment information. The adjuster/examiner client module 410 facilitates the receiving and processing of new assignment requests, client information, and analysis requests, and providing limited forensic data access, and the market user client module 416 provides for the receiving and processing accessible market user client information. The drone field service module 428 enables the receiving and processing drone field data, images and/or video, and post-process field image data, and the data organizer module 434 provides for accessing and receiving technical document databases, historical document databases and/or public information databases.

Various operations performed by the aforementioned modules include collecting data from other sources including, but not limited to, cause and origin data regarding causation of damage conditions, specifications of building materials, and other types of information associated with material specifications/properties for determining causation of damage assessment and generating damage assessment reports as a function of the forensic data collected and tagged to the base images. The operations and associated modules, as also further detailed herein below with respect to FIGS. 6-12, further comprise: (i) receiving and processing, using a mobile unit, imaging files, construction plan files, support files, and user input files, (ii) receiving and generating one or more reports, using an office base unit comprising a report development and analysis module, as a function of post process field data, post process data analysis, checklist reviews, user defined report templates, and data analysis/research and assignment information; (iii) receiving and processing, using an adjuster user client mobile unit, new assignment requests, client information, and analysis requests, and providing limited forensic data access; (iv) receiving and processing, using a market user client desktop unit, accessible market user client information; (v) receiving and processing, using a drone field service module unit, drone field data, images and/or video, and post-process field image data; and (vi) accessing and receiving, using a data organizer, technical document databases, historical document databases and/or public information databases.

Those skilled in the art will appreciate that the present disclosure contemplates the use of systems configurations and/or computer instructions that may perform operations involved in conducting and processing the insurance claim forensic investigations detailed herein. The disclosure of computer instructions that include the insurance claim forensic investigation app 400 and the insurance claim forensic investigation system 200 instructions is not meant to be limiting in any way. Those skilled in the art will readily appreciate that stored computer instructions and/or systems configurations may be configured in any way while still accomplishing the various goals, features, and advantages according to the present disclosure. The terms "program," "application," "software application," and the like as used herein, are defined as a sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. A "program," "computer program," "application," or "software application" may include a subroutine, a function, a procedure, an object method, an object implementation, an executable application, an applet, a servlet, a source code, an object code, a shared library/dynamic load library, and/or other sequence of instructions designed for execution on a computer system. Accordingly, the insurance claim forensic investigation app 400, for example, may be written using any number of programming languages and/or executed on compatible platforms including, but not limited to, JavaScript, PHP (PHP: Hypertext Preprocessor), WordPress, Drupal, Laravel, React.js, Angular.js, and Vue.js. Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on one or more standalone computers, partly on one or more standalone computers, as a stand-alone software package, partly on one or more standalone computers and partly on one or more remote computers, partly on one or more standalone computers and partly on one or more distributed computing environments (such as a cloud environment), partly on one or more remote computers and partly on one or more distributed computing environments, entirely on one or more remote computers or servers, or entirely on one or more distributed computing environments. Standalone computers, remote computers, and distributed computing environments may be connected to each other through any type of network or combination of networks, including local area networks (LANs), wide area networks (WANs), through the Internet (e.g., using an Internet Service Provider), or the connection may be made to external computers.

Figure 5:
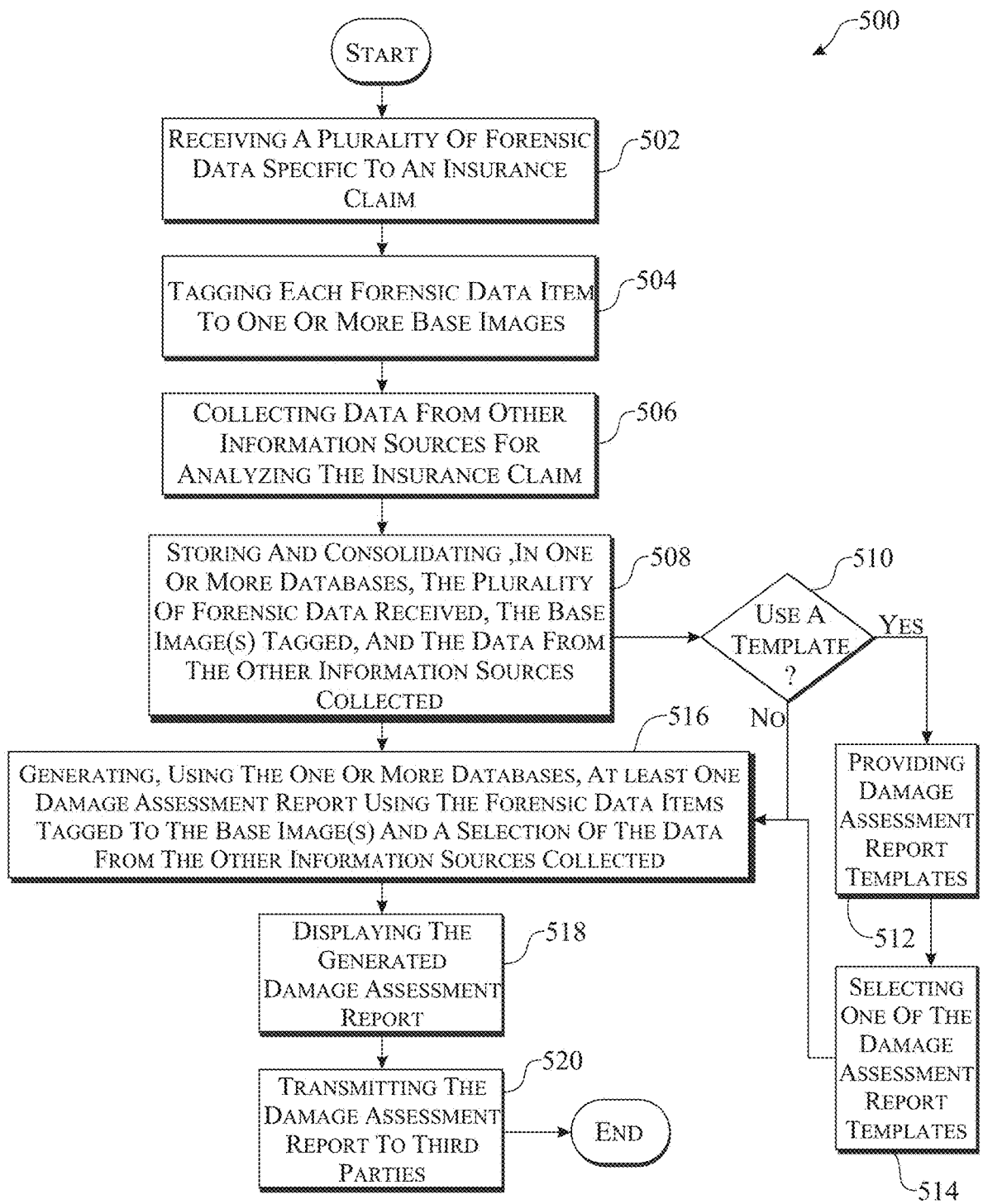
FIG. 5 presents a flowchart of illustrative operations for insurance claim forensic investigation processing in accordance with an embodiment.

Turning our attention to FIG. 5, a flowchart of illustrative operations 500 is shown for insurance claim forensic investigation processing in accordance with an embodiment. More particularly, at step 502, receiving a plurality of forensic data items, the plurality of forensic data items specific to an insurance claim, and at step 504, tagging each forensic data item of the plurality of forensic data to one or more base images. Importantly, in accordance with the embodiments herein, the forensic data collected is damage assessment of property data. Then, at step 506, collecting data from other information sources for analyzing the insurance claim. In accordance with the embodiments herein, this other data includes, but is not limited to, aerial imagery, material cause and origin assessment data, and material specifications with weather information and analysis (as applicable). At step 508, storing and consolidating, in one or more databases, the plurality of forensic data received, the one or more base images tagged to the each forensic data item of the plurality of the forensic data items, and the data from other information sources collected. For example, using the database(s) 124 and/or the database(s) 108. In an embodiment, the user is provided with an option to generate a damage assessment report using one or more report templates. As such, at step 510, a determination is made whether using such a report template is desired and, if so, at steps 512 and 514, providing the available damage assessment reports and selecting one of the templates. At step 516, using the selected template, generating, using the one or more databases, at least one damage assessment report using at least one of the each forensic data items of the plurality of forensic data tagged to the one or more base images and a selection of the data from other information sources collected. If no template is desired, the damage assessment report will be generated using a system selected or standard report format. Then at step 518, displaying the generated damaged assessment report (e.g., on the display of the user device 300) for use and review by the user (e.g., insurance adjuster 116 or third-party expert 118). At step 520, transmitting the damage assessment to one or more third-parties (e.g., a professional engineer and/or registered architect) and the operations end.

Figure 6:
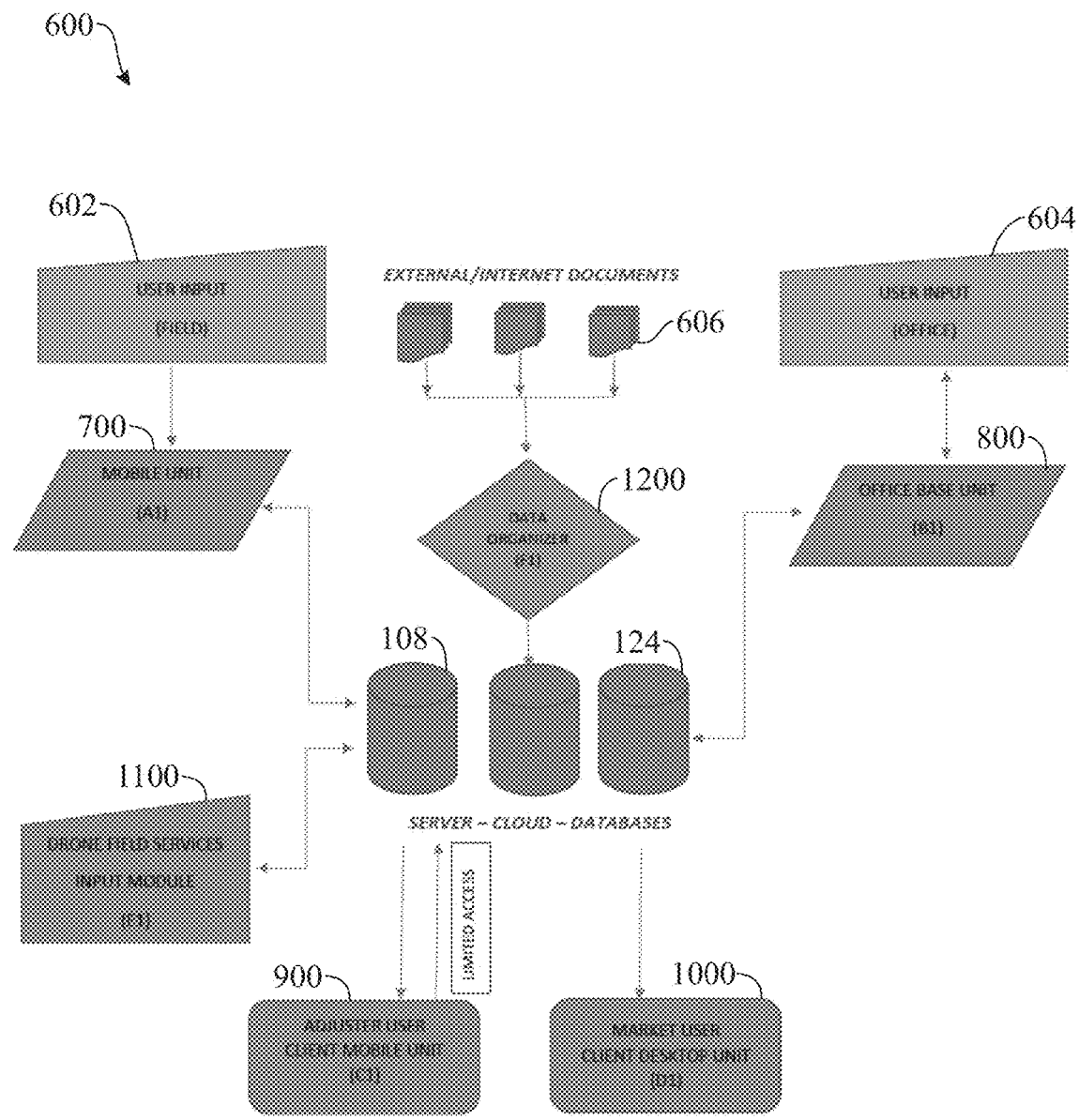
FIG. 6 presents a high-level process flowchart for a forensic investigation service assignment application in accordance with an illustrative embodiment of the present invention.

Turning our attention to FIGS. 6-12, there will now be a discussion of the insurance claim forensic investigation platform hereunder and the various process flowcharts and modules that are related to and further support the aforementioned operations and forensic investigation capability delivered by the insurance claim forensic investigation system 200 (inclusive of the user device 300 and/or the insurance claim forensic investigation app 400). FIG. 6 presents a high-level process flowchart 600 for a forensic investigation service assignment application in accordance with an illustrative embodiment. As shown, the centralized nature of the disclosed embodiments is facilitated by the mobile unit 700, office base unit 800, adjuster user client mobile unit 900, market user client desktop unit 1000, drone field services input module 1100, and data organizer 1200. These elements all combine for the centralized gathering, compilation, use, processing, and storage (e.g., using the database(s) 108 and/or the database(s) 124) of the above-described forensic data this is collected (i.e., damage assessment of property data that is received as user input 602 (e.g., from the field) to the mobile unit 700 (e.g., the user device 300)) and user input 604 (e.g., from an office), and other data collected from other information sources (e.g., external/Internet documents 606) for analyzing the insurance claim (e.g., aerial imagery, material cause and origin assessment data, and material specifications with weather information and analysis (as applicable)). Further, in an embodiment, the adjuster user client mobile unit 900 may be given limited access (e.g., depending upon their user credentials) to the database(s) 108 and/or the database(s) 124 and data/information stored thereon.

Figure 7:
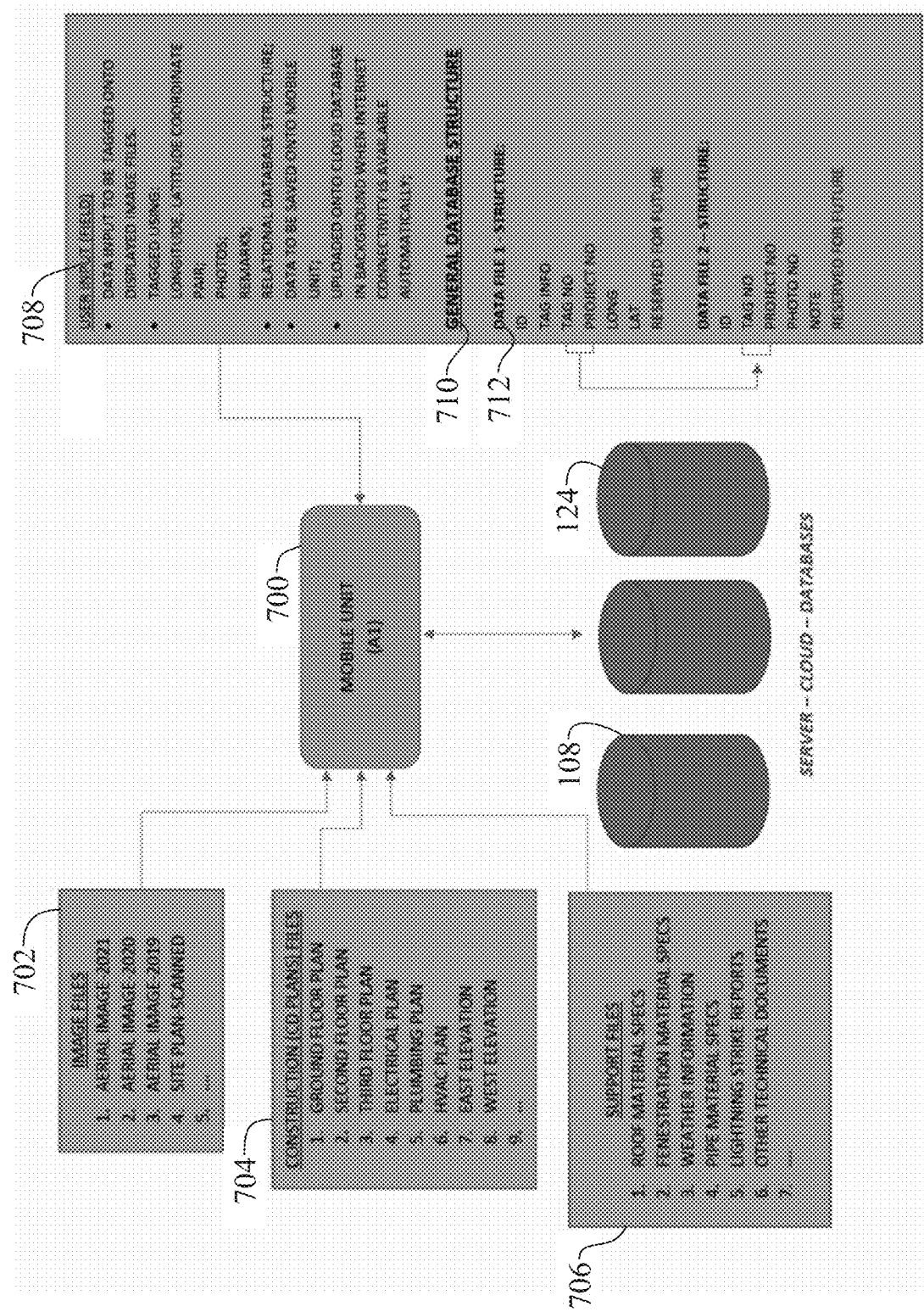
FIG. 7 presents a high-level process flowchart for the mobile unit module for the forensic investigation service assignment application of FIG. 6 in accordance with an illustrative embodiment of the present invention.

FIG. 7 presents a high-level process flowchart for the mobile unit module 700 for the forensic investigation service assignment application of FIG. 6 in accordance with an illustrative embodiment of the present invention. As shown, the mobile unit 700 receives, manages, processes, retrieves and/or transmits (e.g., to or from the database(s) 108 and/or the database(s) 124) a variety of data and information including, but not limited to: (i) image files 702 comprising aerial images and site planned images; (ii) construction files 704 comprising floor plans (e.g., first, second, and third floor), electrical plans, plumbing plans, heating, ventilation and air conditioning (HVAC) plans, elevation plans (e.g., east and west); (iii) support files 706 comprising material specifications (e.g., roof, fenestration, and pipes), lightning strike reports, and other technical documents; and (iv) user input 708 (e.g., from the field) comprising: data to be tagged onto one or more base images for display. In an embodiment, the tagging is done using a pair of longitude and latitude geographical coordinates, photos, and/or remarks. The data itself may be stored directly on the mobile unit (e.g., the user device 300) and/or in the database(s) 108 and/or the database(s) 124 which may be relational databases. In an embodiment, a general database structure 710 employs a data file structure 712 used for the user input 708 comprising fields including, but not limited to, data identification (ID), tag information, tag number, project number, photograph number, longitude, latitude, notes, and other information.

Figure 8:
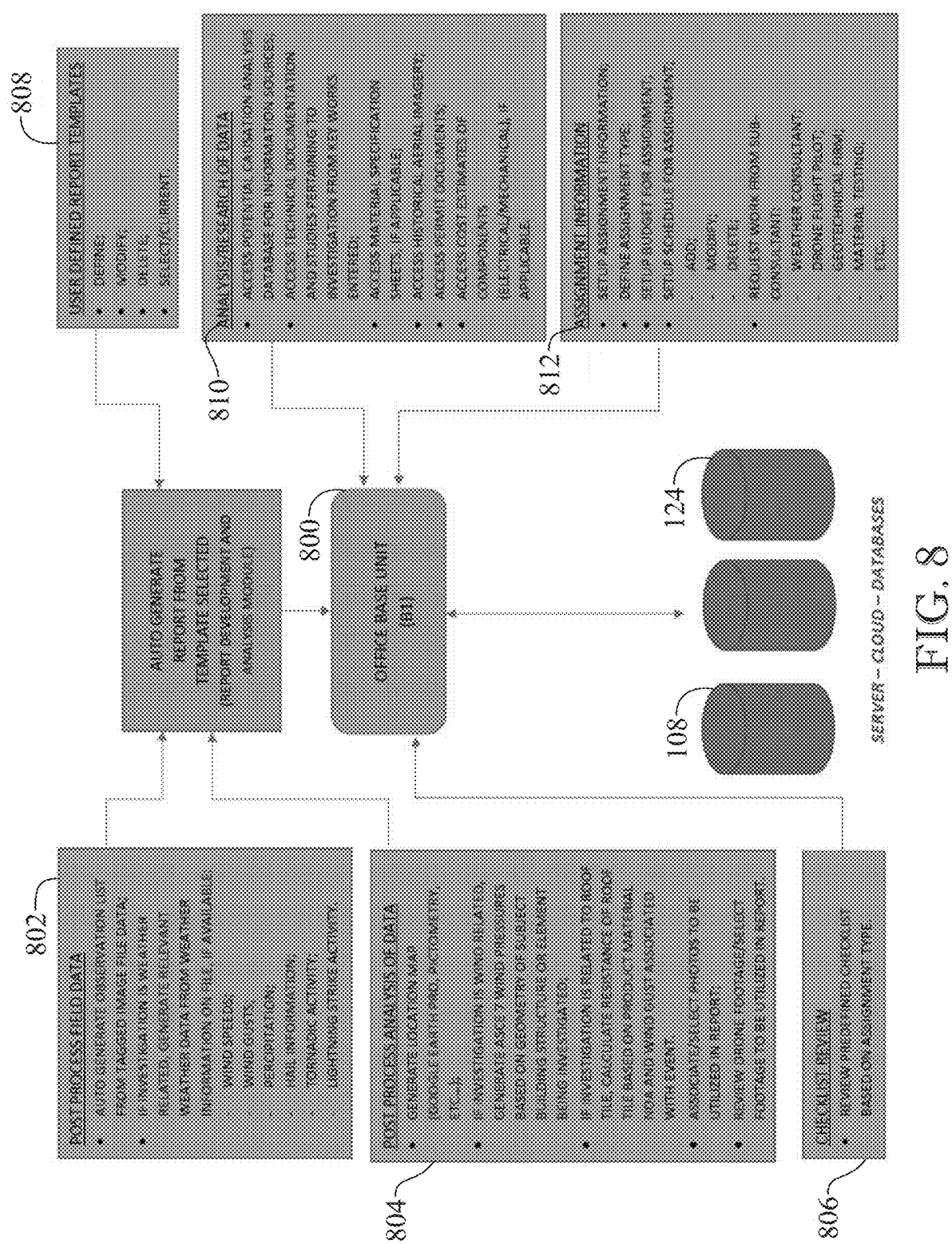
FIG. 8 presents a high-level process flowchart for the office base unit module for the forensic investigation service assignment application of FIG. 6 in accordance with an illustrative embodiment of the present invention.

FIG. 8 presents a high-level process flowchart for the office base unit module 800 for the forensic investigation service assignment application of FIG. 6 in accordance with an illustrative embodiment of the present invention. As shown, the office base unit module 800 receives, manages, processes, retrieves and/or transmits (e.g., to or from the database(s) 108 and/or the database(s) 124) for the purpose of automatic report generation from a selected report template, for example. The office base unit module 800 employs a variety of data and information including, but not limited to: (i) post-process field data 802 comprising an auto-generated observation list generated from the tagged image file data (see, e.g., the user input 708) and weather-related data (as applicable) such as wind speeds, wind gusts, precipitation, hail information, tornado activity, and lightning strike activity; (ii) post-process data analysis 804 comprising generated location map, weather-related data (as applicable) such as wind-related information including wind pressures based on the geometry of the building structure under forensic investigation, roof-related data (as applicable) including roof resistance calculations based on the roof product Notice of Acceptance (NOA), and wind gusts associated with the event under forensic investigation; (iii) checklist review 806 comprising a predefined assignment checklist based on the assignment type (e.g., a hurricane); (iv) user-defined report templates 808; (v) data analysis and research 810 comprising access to (a) a potential causation analysis database for information sources; (b) technical documentation and studies (searchable by keywords) pertaining to the forensic investigation; (c) material specification sheets (as applicable); (d) historical aerial images; (e) governmental/municipality permitting information; and (f) component (electrical and/or mechanical, as applicable) cost estimates; and (vi) assignment information 812 comprising assignment set-up information, assignment type definition, assignment budget, assignment scheduling, and consultant work requests (e.g., weather consultant, UAV/drone pilot, geotechnical firm and/or material testing firm).

Figure 9:
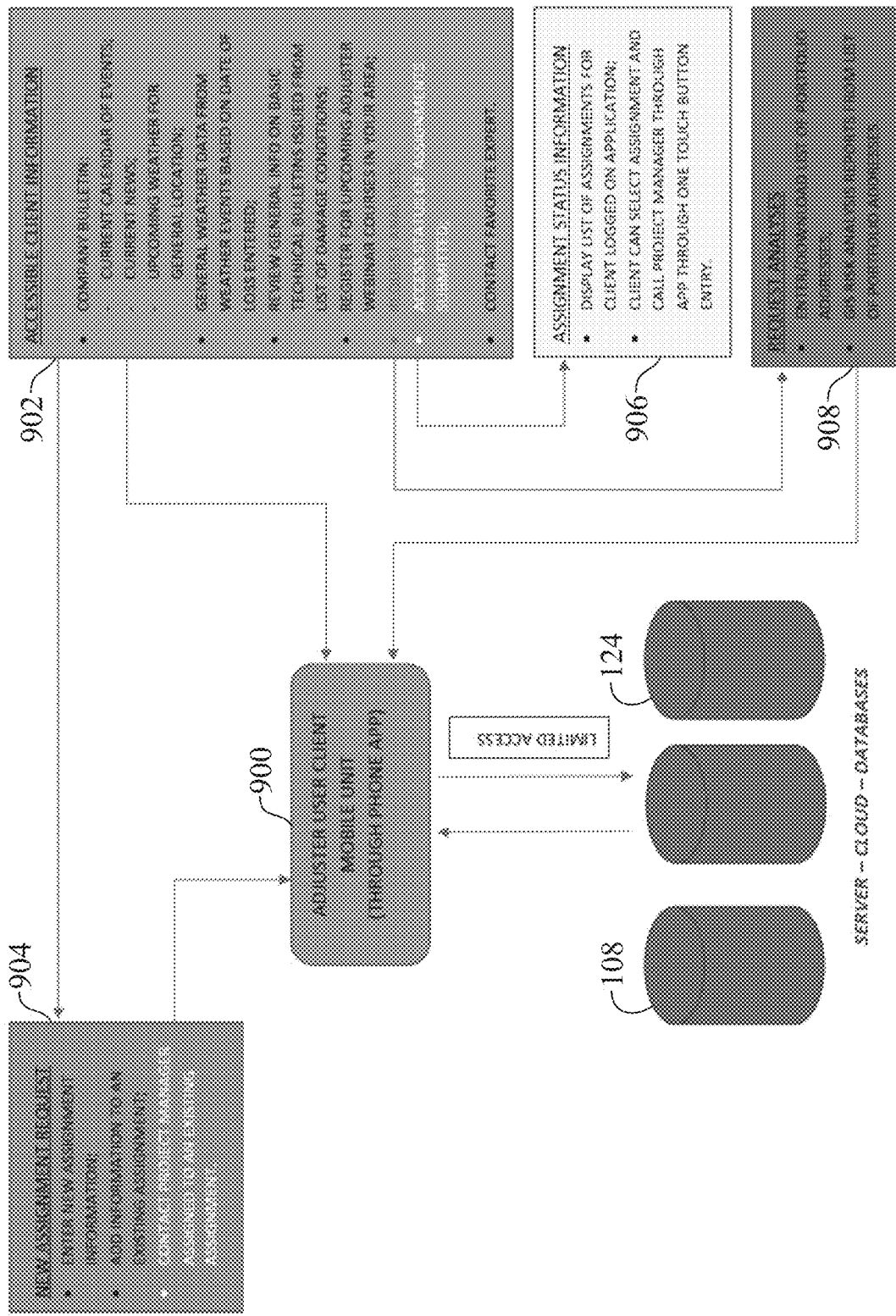
FIG. 9 presents a high-level process flowchart for the adjuster user client mobile unit module for the forensic investigation service assignment application of FIG. 6 in accordance with an illustrative embodiment of the present invention.

FIG. 9 presents a high-level process flowchart for the adjuster user client mobile unit 900 for the forensic investigation service assignment application of FIG. 6 in accordance with an illustrative embodiment of the present invention. As shown, the adjuster user client mobile unit 900 receives, manages, processes, retrieves and/or transmits (e.g., to or from the database(s) 108 and/or the database(s) 124) a variety of data and information including, but not limited to: (i) accessible client information 902 comprising company bulletins (e.g., event calendar, current news, and current weather by location), general weather data from weather events based on the applicable date of loss under forensic investigation, basic technical bulletins as issued from a listing of damage conditions, continuing education opportunities, access the status of submitted assignments, and contacting a favorite third-party expert; (ii) new assignment request 904 comprising entering new assignment information, addition information to an existing assignment and contacting the project manager assigned to an existing assignment; (iii) assignment status information 906 comprising client-specific assignment listing and display thereof, and client-specific assignment selection and project manager contact; and (iv) request analysis 908 comprising entering/downloading portfolio address listing, and Geographic Information System (GIS) risk analyses reports from the portfolio address listing. Further, in an embodiment, the adjuster user client mobile unit 900 may be given limited access (e.g., depending upon their user credentials) to the database(s) 108 and/or the database(s) 124 and data/information stored thereon.

Figure 10:
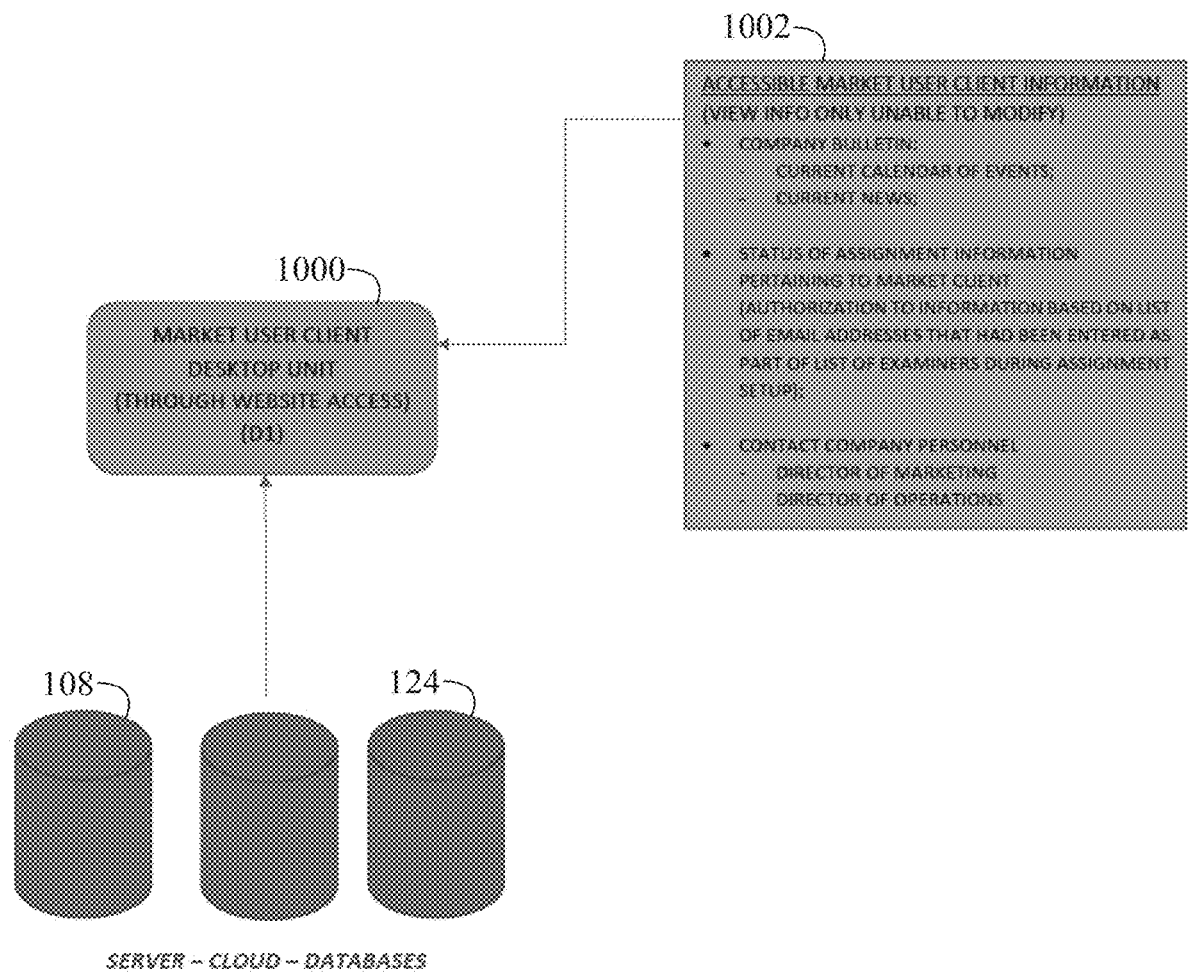
FIG. 10 presents a high-level process flowchart for the market user client desktop unit module for the forensic investigation service assignment application of FIG. 6 in accordance with an illustrative embodiment of the present invention.

FIG. 10 presents a high-level process flowchart for the market user client desktop unit module 1000 for the forensic investigation service assignment application of FIG. 6 in accordance with an illustrative embodiment of the present invention. As shown, the market user client desktop unit module 1000 receives, manages, processes, retrieves and/or transmits (e.g., to or from the database(s) 108 and/or the database(s) 124) a variety of data and information including, but not limited to: accessible market user client information 1002 comprising company bulletins (e.g., event calendar, current news, and current weather by location), company personal contacts, and assignment status information pertaining to the market client. For example, authorization to such information may be based on an electronic mail address listing as received during the assignment's set-up.

Figure 11:
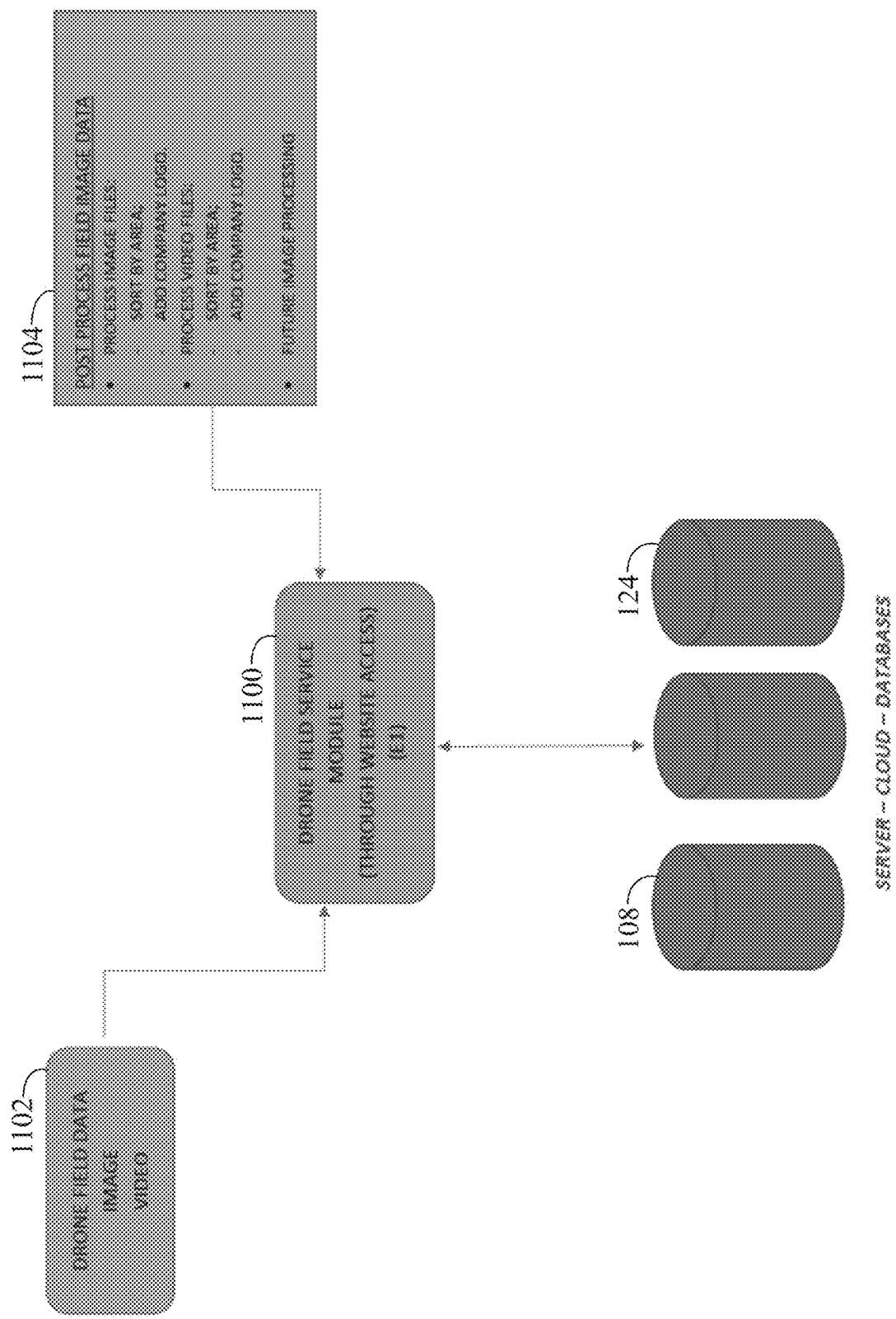
FIG. 11 presents a high-level process flowchart for a drone field service unit module for the forensic investigation service assignment application of FIG. 6 in accordance with an illustrative embodiment of the present invention.

FIG. 11 presents a high-level process flowchart for a drone field service unit module 1100 for the forensic investigation service assignment application of FIG. 6 in accordance with an illustrative embodiment of the present invention. As shown, the drone field service unit module 1100 (see also, FIG. 15) receives, manages, processes, retrieves and/or transmits (e.g., to or from the database(s) 108 and/or the database(s) 124) a variety of data and information including, but not limited to: drone image field data 1102 comprising aerial images, video, and data; and (ii) post-process field image data 1104 comprising processing image files and video files by sorting by area and adding a company designation (e.g., a logo).

Figure 12:
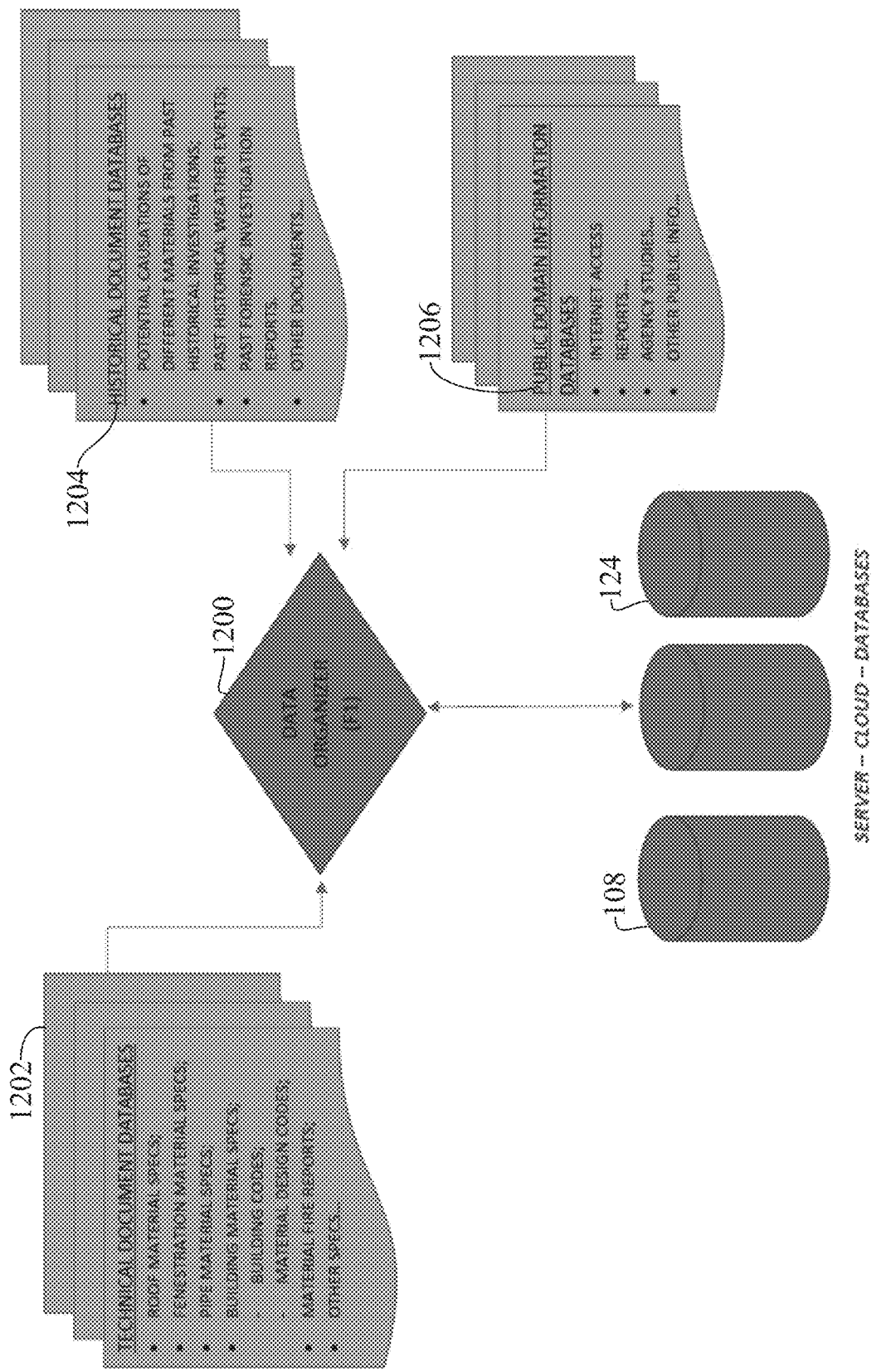
FIG. 12 presents a high-level process flowchart for a data organizer unit module for the forensic investigation service assignment application of FIG. 6 in accordance with an illustrative embodiment of the present invention.

FIG. 12 presents a high-level process flowchart for a data organizer unit module 1200 for the forensic investigation service assignment application of FIG. 6 in accordance with an illustrative embodiment of the present invention. As shown, the data organizer unit module 1200 receives, manages, processes, retrieves and/or transmits (e.g., to or from the database(s) 108 and/or the database(s) 124) a variety of data and information including, but not limited to: technical document database(s) 1202 comprising roof material specifications, fenestration material specifications, pipe material specifications, building materials specifications, material fire reports, and other similar technical document information; (ii) historical document database(s) 1204 comprising potential causations of different materials from historical forensic investigations, historical weather events, historical forensic investigation reports, and other documents; and (iii) public domain information 1206 comprising Internet-access information, reports, agency studies, and other publicly available information.

Thus, the forensic investigation service assignment application and associated processes provide a system and method that will assist the forensic expert and independent adjusting firms in handling insurance claim assignments that deal with claim including, but not limited to, property damage losses, construction defects, builders risk, and/or professional liability. The combination of the process modules is configured to work and interact together to form a full stream forensic investigation service assignment application and platform. Illustratively, the system and method consolidate gathered data that is part of the forensic investigation in a centralized location for ease of access which allows data to be organized, and easily retrieved systematically utilizing relational databases (e.g., structured query language statements (SQL)) thereby assisting the expert user in the analysis of the data, and the generation of damage assessment condition reports utilizing the stored data. Further, system clients (e.g., independent adjusters and the insurance market) have access to selected portions of the processed information either through field mobile devices or through desktop web access devices.

The advantages of the invention include, but are not limited to, a centralized data repositor for forensic investigations, increased efficiency in field data gathering, increased consistency of field data entry thereby allowing for a standardized report format across all types of investigations, ability to group, sort, and organize field data thereby reducing errors and/or omissions, shorter report development cycles, centralized data access via common platform, the linking of support data files and image files to a specific investigation/assignment, standard interface for industry standards software (e.g., WINDXPET ASCE 7 wind analysis software), and a report generator based on the investigation/assignment type and the use of selected report templates. Also, in accordance with the principles of the disclosed embodiments, an integration platform is provided for third-party components using an Application Programming Interface (API), for example, which allows functional and component modularity. Further advantages are the time tracking ability for field personnel on assignment, pre-defined checklists based on the type of investigation thereby facilitating uniform reporting, and ease of access for clients (e.g., performing status checks or contacting a field expert).

Figure 13:
FIG. 13 presents an illustrative user interface showing an exemplary tagging of forensic data items with one or more base images in accordance with an embodiment.

Turning our attention to FIG. 13, an illustrative user interface 1300 is presented showing an exemplary tagging of forensic data items with one or more base images in accordance with an embodiment. As shown, the illustrative user interface 1300 is on the user device 300 and displays base image 1302 that, in accordance with the above-detailed principles of the disclosed embodiments, has been tagged with several forensic data elements that have been collected with respect to a particular damaged property (e.g., property 1312) subject to an insurance claim undergoing forensic investigation having assignment details 1304 comprising a project name, property location, insurance claim number, and insurance policy information. The image files 1306 tagged comprising a current roof image (dated 2021) and a historical roof image (dated 2019) that have been consolidated with additional relevant information comprising CD (plans) files 1308 that further comprise ground floor plans (e.g., floor 1-3), an east elevation, and a west elevation, and support files 1310 further comprising a roof material NOA, a window manufacturer NOA, door manufacturer NOA, a weather report, and a technical document.

Figure 14:
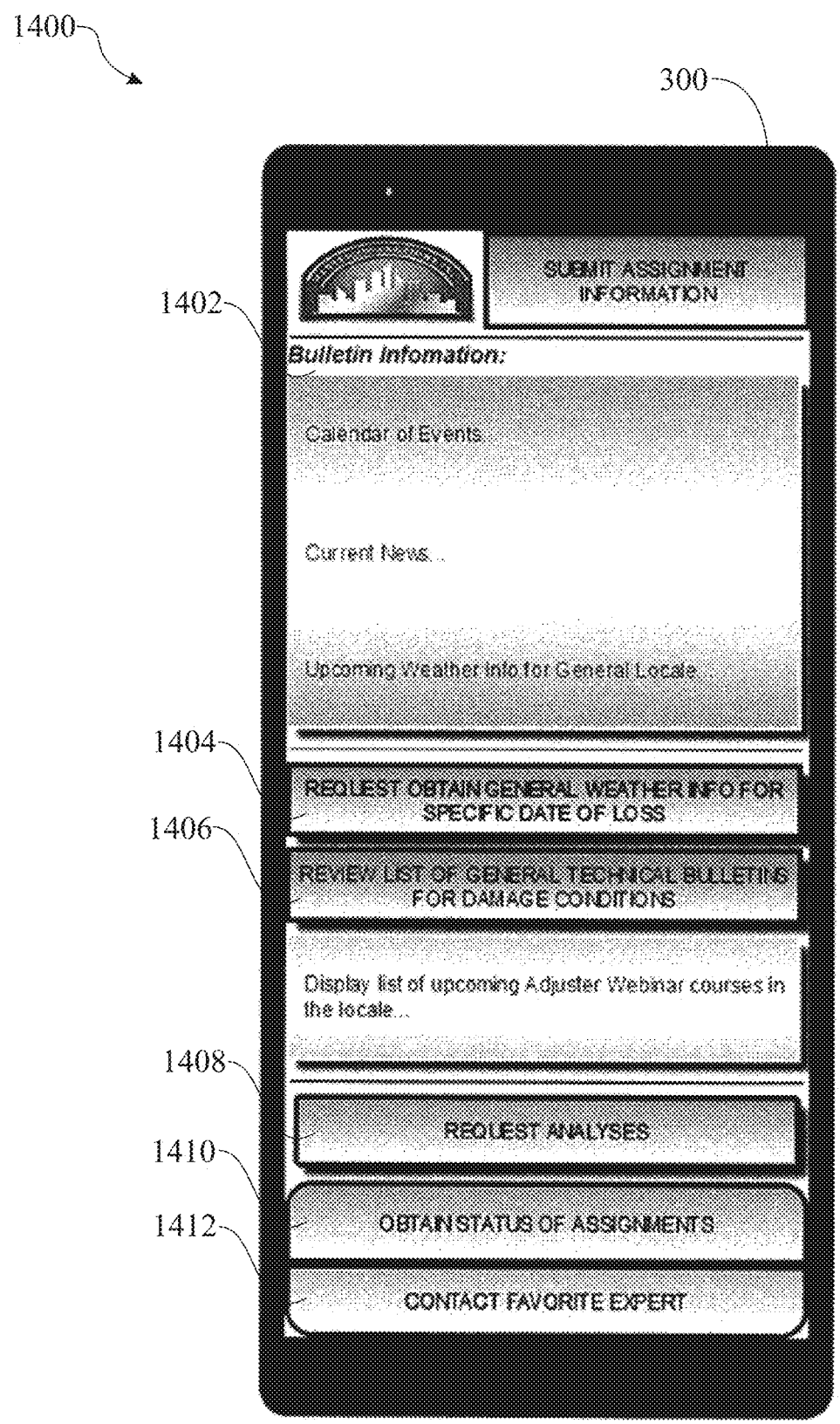
FIG. 14 presents an illustrative user interface for a mobile unit in accordance with an embodiment.

Turning our attention to FIG. 14, an illustrative user interface 1400 for a mobile unit (e.g., the user device 300) is presented in accordance with an embodiment. As shown, the illustrative user interface 1400 is directed to various user functionality for user (e.g., the insurance adjuster 116 or insurance examiner 114) access including bulletin information 1402, requesting general weather information a specific date of loss 1404, reviewing a list of general technical bulletins for damage conditions 1406, requesting analyses 1408, obtaining status of assignments 1410, and contacting a favorite expert 1412.

Figure 15:
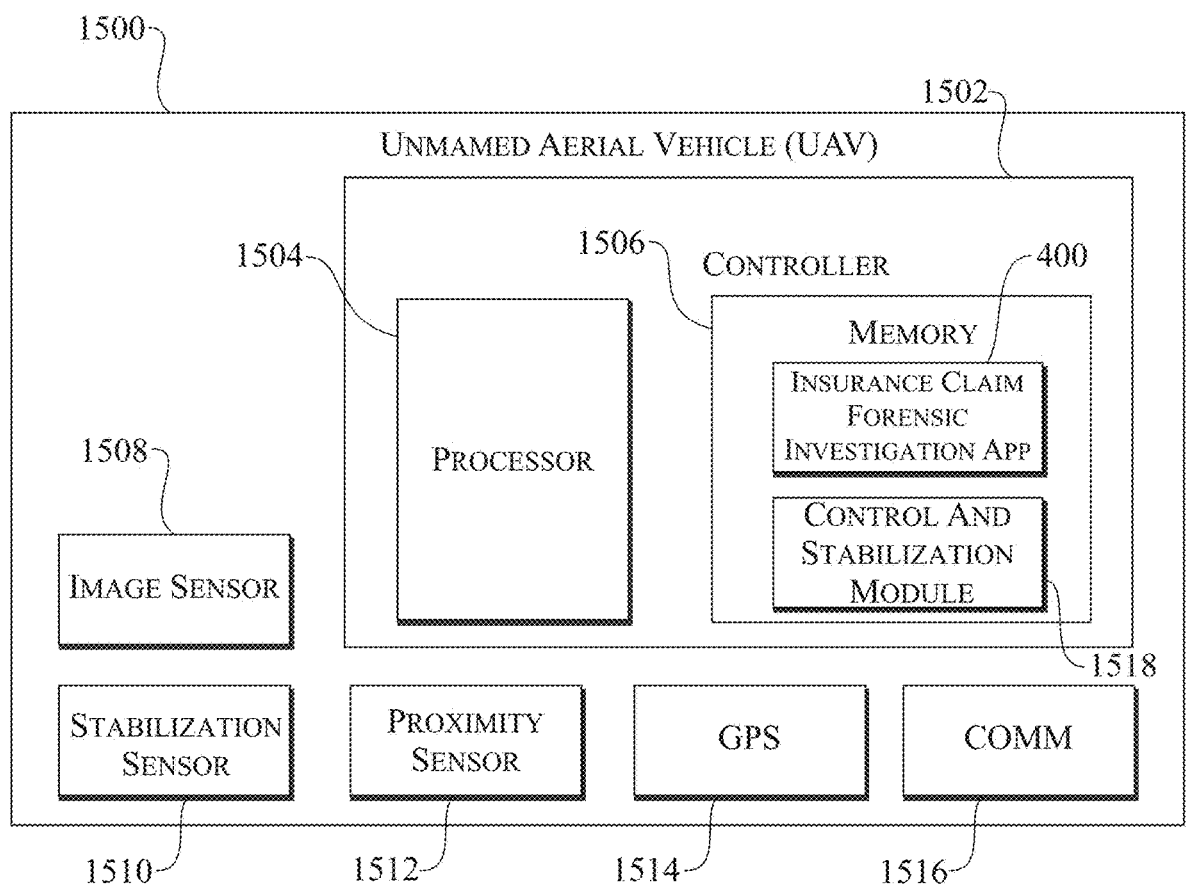
FIG. 15 presents an illustrative schematic of an unmanned aerial vehicle (UAV) for use in insurance claim forensic investigation configured in accordance with an embodiment.

As detailed previously, in accordance with the disclosed embodiments, a variety of information may be collected by and transmitted from an unmanned aerial vehicle (UAV), for example, a drone. FIG. 15 presents a schematic for an illustrative UAV 1500 configured in accordance with an embodiment. As shown, The UAV 1500 may include a controller 1502 that communicates with one or more proximity sensor 1512, one or more stabilization sensor 1510, a GPS unit 1514, one or more image sensor 1508, and/or a communications unit 1516. The image sensor 1508 may include one or more filters for infrared imaging, hyperspectral imaging, multispectral imaging, full spectral imaging, or alternatively, the image sensor 1508 may include one or more sensors which receive image data outside of the visible light spectrum, such as an infrared image sensor. For example, a plurality of still images and video images may be collected by the UAV 1500 and received by, for example, insurance claim forensic investigation system 200 and/or the insurance claim forensic investigation app 400 for processing. In turn, one or more of the base images that will be tagged may be selected from the plurality of still images and video received form the UAV 1500 in an embodiment. The controller 1502 may include a processor 1504 that executes instructions from a memory 1506 inclusive of the insurance claim forensic investigation app 400 for delivering the forensic investigation operations as detailed above including, but not limited to, the drone field service module 1100 and other instructions for implementing a control and stabilization module 1518.

The control and stabilization module 1518 may retrieve data from the stabilization sensors 1510 (i.e., sensors relating avionics) to implement a control function to maintain the stability of the UAV 1500 when in flight. The control and stabilization module 1518 may also retrieve data from the proximity sensors 1512 that assists the control and stabilization module 1518 in determining a distance and a direction to a particular location (e.g., the insured property undergoing forensic investigation). The proximity sensors 1512 may include optic flow sensors, ultrasonic sensors, infrared sensors, LIDAR (Light Detection and Ranging), a stereo vision system (SYS) that may utilize the image sensors 1508 to implement stereoscopic imaging techniques to capture aerial images of the property undergoing forensic investigation including creating 3D images of the insured property.

The GPS unit 1514 may use any suitable global positioning protocol or system that locates the position of the UAV 1500. Moreover, the GPS unit 1514 may also determine the position of the aerial images or of data points within the aerial images captured by the UAV 1500, or the GPS unit 1514 may be combined with the distance and direction sensors to determine the position of the aerial images, and positions of data points within an aerial image, all which can be used for tagging of base images in accordance with the principles of the embodiment herein. The communication unit 1516 may communicate with the user device 300 (e.g., a server or a workstation) via any suitable wireless communication protocol network, for example, GSM, CDMA, LTE, a Wi-Fi network, a Bluetooth network, to name just a few.

As noted above, in some embodiments the method or methods described above may be executed or carried out by a computing system including a non-transitory computer-readable storage medium, also referred to as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g., FIGS. 5 and 6-12) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An insurance claim forensic investigation method comprising:
    under control of an insurance claim forensic investigation system comprising at least a processor and a memory configured for executing a computer program that when executed, cause the insurance claim forensic investigation system to perform operations comprising:

receiving, through communication with one or more centralized cloud network-based databases, a plurality of forensic data items, the plurality of forensic data items specific to an insurance claim;

receiving, from an unmanned aerial vehicle (UAV), a plurality of still images and video images specific to the insurance claim;

storing the plurality of still images and video images specific to the insurance claim; in the one or more centralized cloud network-based databases;

selecting at least one of the plurality of still images and video images received and stored for use as a base image;

retrieving, through communication with the one or more centralized cloud network-based databases, one or more base images;

tagging each forensic data item of the plurality of forensic data received to the one or more base images retrieved, wherein the plurality of forensic data items are tagged using at least a pair of longitude and latitude coordinates, at least one photograph, and at least one remark;

generating an observation list from the forensic data items of the plurality of forensic data tagged to the one or more base images;

collecting data, through communication with the one or more centralized cloud network-based databases, from other information sources for analyzing the insurance claim, wherein the data from other information sources collected comprises cause and origin data regarding causation of damage conditions, specifications of building materials, and information associated with material specifications/properties for determining causation of damage assessment comprising at least causation and origin analysis of property damage conditions comprising wind, moisture, intrusion, fire, and natural disasters;

providing, through communication with the one or more centralized cloud network-based databases, a plurality of damage assessment report templates;

receiving, through communication with the one or more centralized cloud network-based databases, a selection of a particular one damage assessment report template of the plurality of damage assessment report templates provided for use in generating at least one damage assessment report using at least one of the forensic data items of the plurality of forensic data tagged to the one or more base images and a selection of the data from other information sources collected;

storing and consolidating, in the one or more centralized cloud network-based databases, the plurality of forensic data received, the one or more base images tagged to the each forensic data item of the plurality of the forensic data items, the observation list generated, and the data from other information sources collected; and generating, using the one or more centralized cloud network-based databases and the particular one damage assessment report template selected, the at least one damage assessment report using at least one of the forensic data items of the plurality of forensic data tagged to the one or more base images and a selection of the data from other information sources collected.

2. The insurance claim forensic investigation method of claim 1, wherein the insurance claim is directed to at least one of a property loss claim, a construction defect claim, a builder's risk claim and a professional liability claim.

3. The insurance claim forensic investigation method of claim 1, wherein the plurality of forensic data items are associated with property damage assessment.

4. The insurance claim forensic investigation method of claim 1, wherein the method further comprises:
collecting the plurality of forensic data items.

5. The insurance claim forensic investigation method of claim 1, wherein the one or more base images comprises at least one of aerials, construction documents, site plans and maps.

6. The insurance claim forensic investigation method of claim 5, wherein the data from other information sources collected comprises at least one of cause and origin data regarding causation of damage conditions, specifications of building materials, and information associated with material specifications/properties for determining causation of damage assessment.

7. The insurance claim forensic investigation method of claim 1, wherein the method further comprises:
transmitting the at least one damage report generated to one or more third-party experts.

8. The insurance claim forensic investigation method of claim 1, wherein the one or more centralized cloud network-based databases are relational databases.

9. The insurance claim forensic investigation method of claim 1, wherein the operations further comprise:
displaying the at least one damage assessment report generated.

10. An insurance claim forensic investigation method comprising:
under control of an insurance claim forensic investigation system comprising at least a processor and a memory configured for executing a computer program that when executed, cause the insurance claim forensic investigation system to perform operations comprising:

receiving a plurality of forensic data items, the plurality of forensic data items specific to an insurance claim, wherein the insurance claim is directed to at least one of a property loss claim, a construction defect claim, a builder's risk claim and a professional liability claim;

receiving, from an unmanned aerial vehicle (UAV), a plurality of still images and video images specific to the insurance claim;

storing the plurality of still images and video images specific to the insurance claim; in the one or more centralized cloud network-based databases;

selecting at least one of the plurality of still images and video images received and stored for use as a base image;

retrieving, through communication with the one or more centralized cloud network-based databases, one or more base images;

tagging each forensic data item of the plurality of forensic data to the one or more base images retrieved, wherein the plurality of forensic data items are tagged using at least a pair of longitude and latitude coordinates, at least one photograph, and at least one remark;

generating an observation list from the forensic data items of the plurality of forensic data tagged to the one or more base images;

collecting data, through communication with the one or more centralized cloud network-based databases, from other information sources for analyzing the insurance claim, wherein the data from other information sources collected comprises cause and origin data regarding causation of damage conditions, specifications of building materials, and information associated with material specifications/properties for determining causation of damage assessment comprising at least causation and origin analysis of property damage conditions comprising wind, moisture, intrusion, fire, and natural disasters;

providing, through communication with the one or more centralized cloud network-based databases, a plurality of damage assessment report templates;

receiving, through communication with the one or more centralized cloud network-based databases, a selection of a particular one damage assessment report template of the plurality of damage assessment report templates provided for use in at least one damage assessment report using at least one of the forensic data items of the plurality of forensic data tagged to the one or more base images and a selection of the data from other information sources collected;

storing and consolidating, in the one or more centralized cloud network-based databases, the plurality of forensic data received, the one or more base images tagged to the each forensic data item of the plurality of the forensic data items, the observation list generated, and the data from other information sources collected; and generating, using the one or more centralized cloud network-based databases and the particular one damage assessment report template selected, the at least one damage assessment report using at least one of the forensic data items of the plurality of forensic data tagged to the one or more base images and a selection of the data from other information sources collected.

11. The insurance claim forensic investigation method of claim 10, wherein the insurance claim forensic investigation method further comprises:

transmitting the at least one damage report generated to one or more third-party experts.

12. The insurance claim forensic investigation method of claim 10, wherein the one or more base images comprising at least one of aerials, construction documents, site plans and maps.

13. An insurance claim forensic investigation method comprising:

under control of an insurance claim forensic investigation system comprising at least a processor and a memory configured for executing a computer program that when executed, cause the insurance claim forensic investigation system to perform operations comprising:

receiving a plurality of forensic data items, the plurality of forensic data items specific to an insurance claim, wherein the insurance claim is directed to at least one of a property loss claim, a construction defect claim, a builder's risk claim, and a professional liability claim;

receiving, from an unmanned aerial vehicle (UAV), a plurality of still images and video images specific to the insurance claim;

storing the plurality of still images and video images specific to the insurance claim; in the one or more centralized cloud network-based databases;

selecting at least one of the plurality of still images and video images received and stored for use as a base image;

retrieving, through communication with one or more centralized cloud network-based relational databases, one or more base images;

tagging each forensic data item of the plurality of forensic data to one or more base images retrieved, wherein the one or more base images comprises at least one of aerials, construction documents, site plans and maps, wherein the plurality of forensic data item are tagged using at least a pair of longitude and latitude coordinates, at least one photograph, and at least one remark;

generating an observation list from the forensic data items of the plurality of forensic data tagged to the one or more base images;

collecting data, through communication with the one or more centralized cloud network-based relational databases, from other information sources for analyzing the insurance claim, wherein the data from other information sources collected comprises cause and origin data regarding causation of damage conditions, specifications of building materials, and information associated with material specifications/properties for determining causation of damage assessment comprising at least causation and origin analysis of property damage conditions comprising wind, moisture, intrusion, fire, and natural disasters;

storing and consolidating, in the one or more centralized cloud network-based relational databases, the plurality of forensic data received, the one or more base images tagged to the each forensic data item of the plurality of the forensic data items, the observation list generated, and the data from other information sources collected;

providing, through communication with the one or more centralized cloud network-based relational databases, a plurality of damage assessment report templates;

receiving, through communication with the one or more centralized cloud network-based relational databases, a selection of a particular one damage assessment report template of the plurality of damage assessment report templates provided for generating at least one damage assessment report using at least one of the each forensic data items of the plurality of forensic data tagged to the one or more base images and a selection of the data from other information sources collected;

generating, using the one or more centralized cloud network-based relational databases, at least one damage assessment report from the particular one damage assessment report template selected, at least one of the forensic data items of the plurality of forensic data tagged to the one or more base images and a selection of the data from other information sources collected;

displaying the at least one damage assessment report generated; and transmitting the at least one damage report generated to one or more third-party experts.

* * * * *